(12) United States Patent
Tanaka et al.

(10) Patent No.: US 8,523,991 B2
(45) Date of Patent: *Sep. 3, 2013

(54) INK COMPOSITION, INK COMPOSITION FOR INKJET RECORDING, INK SET, INK CARTRIDGE, INKJET RECORDING METHOD, AND RECORDED PRODUCT

(75) Inventors: Shigeaki Tanaka, Shizuoka (JP); Keiichi Tateishi, Shizuoka (JP); Takashi Ozawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 241 days.

This patent is subject to a terminal disclaimer.

(21) Appl. No.: 12/999,251

(22) PCT Filed: Jun. 15, 2009

(86) PCT No.: PCT/JP2009/060901
§ 371 (c)(1),
(2), (4) Date: Dec. 15, 2010

(87) PCT Pub. No.: WO2009/154184
PCT Pub. Date: Dec. 23, 2009

(65) Prior Publication Data
US 2011/0091696 A1 Apr. 21, 2011

(30) Foreign Application Priority Data
Jun. 16, 2008 (JP) .................................. 2008-157029

(51) Int. Cl.
*C09D 11/02* (2006.01)
(52) U.S. Cl.
USPC ..................................... 106/31.48; 106/31.58
(58) Field of Classification Search
USPC ........... 106/31.48, 31.58; 347/100; 427/256; 428/195.1
See application file for complete search history.

(56) References Cited

U.S. PATENT DOCUMENTS

| | | | | |
|---|---|---|---|---|
| 5,370,731 | A * | 12/1994 | Yamashita et al. | 106/31.43 |
| 7,465,347 | B2 * | 12/2008 | Kitamura et al. | 106/31.48 |
| 7,776,144 | B2 * | 8/2010 | Taguchi et al. | 106/31.48 |
| 8,101,011 | B2 * | 1/2012 | Tateishi et al. | 106/31.48 |
| 8,257,479 | B2 * | 9/2012 | Goto et al. | 106/31.48 |
| 2008/0145561 | A1 * | 6/2008 | Kitamura et al. | 106/31.48 |
| 2008/0151028 | A1 | 6/2008 | Yamakami et al. | |
| 2008/0274283 | A1 * | 11/2008 | Tateishi et al. | 427/256 |
| 2010/0302305 | A1 * | 12/2010 | Tateishi et al. | 106/31.5 |
| 2011/0091696 | A1 * | 4/2011 | Tanaka et al. | 428/195.1 |
| 2011/0104458 | A1 * | 5/2011 | Tanaka et al. | 106/31.48 |

FOREIGN PATENT DOCUMENTS

| | | |
|---|---|---|
| EP | 1 619 224 A1 | 1/2006 |
| EP | 1 847 570 A1 | 10/2007 |
| EP | 1 935 949 A1 | 6/2008 |
| EP | 2 048 204 A1 | 4/2009 |
| JP | 6-136309 A | 5/1994 |
| JP | 6-234943 A | 8/1994 |
| JP | 6-240189 A | 8/1994 |
| JP | 2001-271013 A | 10/2001 |
| JP | 2006-28296 A | 2/2006 |
| JP | 2007-63520 A | 3/2007 |
| JP | 2007-70566 A | 3/2007 |
| JP | 2007-91867 A | 4/2007 |
| JP | 2008-173965 A | 7/2008 |
| WO | 2005/075573 A1 | 8/2005 |
| WO | 1 619 224 A1 | 1/2006 |
| WO | WO 2006/082669 A1 * | 8/2006 |
| WO | 2007/083840 A1 | 7/2007 |
| WO | 2008/013221 A1 | 1/2008 |

OTHER PUBLICATIONS

Machine translation of JP 2007/091867, Apr. 2007.*
Extended European Search Report dated Oct. 5, 2012 in European Application No. 09766632.5.

(Continued)

*Primary Examiner* — Helene Klemanski
(74) *Attorney, Agent, or Firm* — Sughrue Mion, PLLC

(57) ABSTRACT

An ink composition is provided which does not undergo decomposition or fading of colorants even when stored under high-temperature environment. An ink composition which contains a compound represented by the following general formula (1) and a humectant, wherein the content of the compound represented by the general formula (1) is from 0.1% by mass to less than 7.0% by mass, the content of the humectant having 3 or more hydroxyl groups is 8.0% by mass or less, and the molar ratio of the humectant having 3 or more hydroxyl groups/the compound represented by the general formula (1) being less than 15.0;

General formula (1)

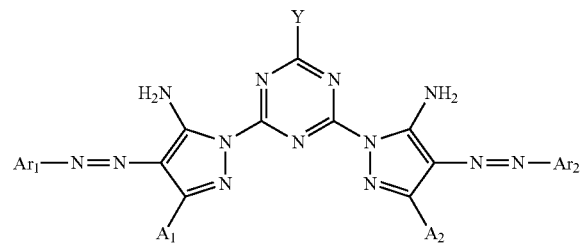

wherein $Ar_1$ and $Ar_2$ each independently represents an aromatic hydrocarbon ring group, a non-aromatic hydrocarbon ring group, an aromatic heterocyclic group, or a non-aromatic heterocyclic group, $A_1$ and $A_2$ each independently represents a hydrogen atom or a substituent, Y represents —OM or —$NR_1R_2$, M represents a hydrogen atom or a metal ion, and $R_1$ and $R_2$ each independently represents a hydrogen atom, an alkyl group, an alkenyl group, an alkynyl group, an aralkyl group, an aryl group, or a heterocyclic group.

19 Claims, No Drawings

(56) References Cited

OTHER PUBLICATIONS

International Search Report for PCT/JP2009/060901 dated Jul. 14, 2009 [PCT/ISA/210].
Written Opinion for PCT/JP2009/060901 dated Jul. 14, 2009 [PCT/ISA/237].

Office Action dated Jan. 29, 2013 in Chinese Patent Application No. 200980122760.7.
Office Action dated Apr. 2, 2013 in Japanese Patent Application No. 2008-157029.
Office Action issued Jul. 23, 2013, by the European Patent Office in European Application No. 09 766 632.5.

* cited by examiner

INK COMPOSITION, INK COMPOSITION FOR INKJET RECORDING, INK SET, INK CARTRIDGE, INKJET RECORDING METHOD, AND RECORDED PRODUCT

TECHNICAL FIELD

The present invention relates to an ink composition wherein a compound represented by the general formula (1) and contained in the ink composition is stable without undergoing change in color or fading when stored for a long time, and which forms a printed image having excellent light fastness and ozone fastness; an ink composition for inkjet recording using it; an ink set; an ink cartridge; an inkjet recording method; and to a recorded product.

BACKGROUND ART

In recent years, as image-recording materials, materials for forming color images have been particularly predominant and, specifically, recording materials for an inkjet system, recording materials for a thermal transfer system, recording materials for an electrophotographic system, transfer type silver halide light-sensitive materials, printing inks, and recording pens have found widespread use.

Colorants to be used in an ink composition are required to exhibit good solubility or dispersibility in a solvent, allow for high-density recording, provide a good color hue, form an image with good storage stability, be excellent in fastness to water and chemicals, have no toxicity, have high purity and, further, be available at a low cost.

That is, colorants have been improved so as to be fast to light, heat, and active gases in the environment (for example, an oxidative gas such as NOx or ozone, and SOx) by enhancing electric potential of colorant molecules (patent document 1).

On the other hand, as performance required for an ink composition, there are illustrated prevention of blurring of a colorant upon printing (patent document 5) as well as prevention of precipitation of a colorant from an ink composition or prevention of freezing of an ink composition (patent document 2), prevention of curling upon printing a substrate with an ink composition (patent document 3), and prevention of putrefaction of an ink composition (patent document 4) and, for enhancing such performance, various additives have been used in an ink composition.

As is described in patent document 6, dissolution stability of a colorant has been improved with an additive to thereby provide performance of a colorant or storage stability of an ink composition. However, it is difficult to create an ink composition which can satisfy all requirements at high levels.

Preceding Technical Documents

Patent Documents

Patent document 1: JP-A-2007-63520
Patent document 2: JP-A-2001-271013
Patent document 3: JP-A-6-240189
Patent document 4: JP-A-6-234943
Patent document 5: JP-A-6-136309
Patent document 6: JP-A-2007-70566

SUMMARY OF THE INVENTION

Problems that the Invention is to Solve

An object of the present invention is to provide an ink composition which does not undergo decomposition of a colorant contained in the ink composition or change in color of the colorant even when the ink composition is stored under a high temperature environment such as would occur in, for example, a car in a summer season.

Means for Solving the Problems

It has become apparent that, while the aforesaid colorants having an enhanced electric potential have excellent light fastness and ozone fastness, they are susceptible to the attack by an electron-rich nucleophilic species and undergo accelerated decomposition in the presence of an additive contained in the ink composition, particularly a humectant having 3 or more hydroxyl groups, thus undergoing color fading or change in color when the ink composition is stored for a long time.

So, the inventors have promoted establishment of technology which provides storage stability while keeping light fastness and ozone gas fastness of an image, with aiming at acquisition of both colorant performance and storage stability of an ink composition.

As a result of checking for a component in an ink composition containing a colorant having an enhanced electric potential and having excellent fastness to light, heat, and active gases in an environment which component promotes decomposition of the aforesaid colorant having an enhanced electric potential, the inventor has found that a compound having hydroxyl groups relates to decomposition of the aforesaid colorant having an enhanced electric potential. It has particularly been found that, when a compound having 3 or more hydroxyl groups exists in a specific amount or more than that in the ink composition, decomposition of the aforesaid colorant having an enhanced electric potential becomes remarkable and that, in the case where the concentration of the aforesaid colorant having an enhanced electric potential in the ink composition is small, decomposition of the aforesaid colorant having an enhanced electric potential is also remarkable. It may be presumed that this is the result that the compound having 3 or more hydroxyl groups causes multi-point mutual action with the colorant having an enhanced electric potential to induce activation of the colorant based on electron effect, leading to promotion of hydrolysis and decomposition of the colorant having an enhanced electric potential. However, the invention is not limited at all by such presumption. The compound having hydroxyl groups contained in the ink composition is being used as a humectant, and its addition amount to the ink composition is large. Thus, giving attention to the humectant, particularly humectant having 3 or more hydroxyl groups, the inventor has found that, by adjusting the amount of the humectant, storage stability of the ink composition can be improved and both light fastness and ozone gas fastness of a printed image product formed from the ink composition can be obtained, thus having completed the invention.

The problems of the invention can be solved by the following approaches.

<1> An ink composition which contains a compound represented by the following general formula (1) and a humectant, wherein the content of the compound represented by the general formula (1) is from 0.1% by mass to less than 7.0% by mass, the content of the humectant having 3 or more hydroxyl groups is 8.0% by mass or less, and the molar ratio of the humectant having 3 or more hydroxyl groups/the compound represented by the general formula (1) is less than 15.0;

[Chem. 1]

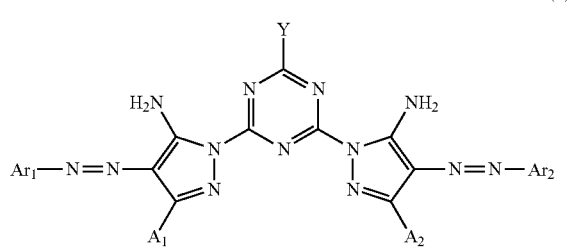

General formula (1)

wherein in the above general formula (1), $Ar_1$ and $Ar_2$ each independently represents an aromatic hydrocarbon ring group, a non-aromatic hydrocarbon ring group, an aromatic heterocyclic group, or a non-aromatic heterocyclic group, $A_1$ and $A_2$ each independently represents a hydrogen atom or a substituent, Y represents —OM or —$NR_1R_2$, M represents a hydrogen atom or a metal ion, and $R_1$ and $R_2$ each independently represents a hydrogen atom, an alkyl group, an alkenyl group, an alkynyl group, an aralkyl group, an aryl group, or a heterocyclic group.

<2> The ink composition described in <1>, wherein the content of the humectant having 3 or more hydroxyl groups is 5.0% by mass or less.

<3> The ink composition described in <1> or <2>, wherein the molar ratio is less than 5.0.

<4> The ink composition described in any one of <1> to <3>, wherein the molar ratio is less than 2.0.

[Chem. 3]

<5> The ink composition described in any one of <1> to <4>, which further contains a humectant having from 0 to 2 hydroxyl groups.

<6> The ink composition described in any one of <1> to <5>, wherein the content of the humectant having 3 or more hydroxyl groups is less than 18.0% by mass of all humectants.

<7> The ink composition described in any one of <1> to <6>, wherein the content of the humectant having 3 or more hydroxyl groups is less than 10.0% by mass of all humectants.

<8> The ink composition described in any one of <1> to <7>, wherein the content of the humectant having 3 or more hydroxyl groups is less than 4.0% by mass of all humectants.

<9> The ink composition described in any one of <1> to <8>, wherein the compound represented by the general formula (1) is a compound represented by the general formula (2);

[Chem. 2]

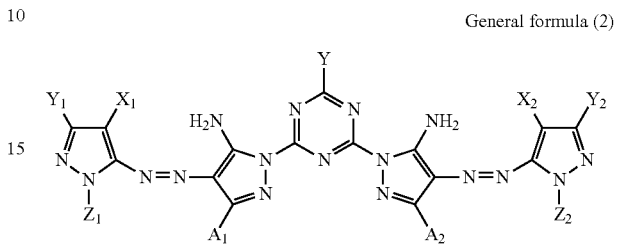

General formula (2)

wherein in the above general formula (2), $A_1$, $A_2$, and Y are the same as $A_1$, $A_2$, and Y in the general formula (1), $Y_1$ and $Y_2$ each independently represents a hydrogen atom or a substituent, $X_1$ and $X_2$ each independently represents an electron-withdrawing group having a Hammett σp value of 0.20 or more, and $Z_1$ and $Z_2$ each independently represents a hydrogen atom, an alkyl group, an alkenyl group, an alkynyl group, an aralkyl group, an aryl group, or a heterocyclic group.

<10> The ink composition described in <9>, wherein the compound represented by the general formula (2) is a compound represented by the general formula (3);

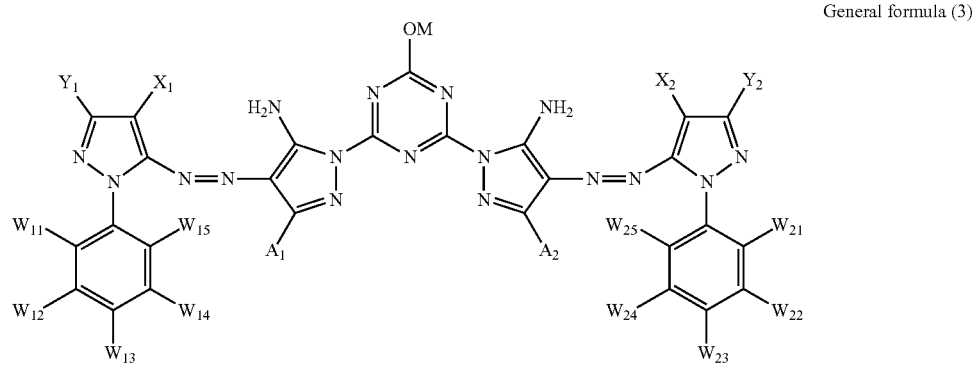

General formula (3)

wherein in the above general formula (3), $A_1$, $A_2$, $X_1$, $X_2$, $Y_1$, and $Y_2$ are the same as $A_1$, $A_2$, $X_1$, $X_2$, $Y_1$, and $Y_2$ in the general formula (2), $W_{11}$, $W_{12}$, $W_{13}$, $W_{14}$, $W_{15}$, $W_{21}$, $W_{22}$, $W_{23}$, $W_{24}$, and $W_{25}$ each independently represents a hydrogen atom or a substituent, and M represents a hydrogen atom or a metal ion.

<11> The ink composition described in any one of <1> to <8>, wherein the compound represented by the general formula (1) is a compound represented by the general formula (4);

[Chem. 4]

General formula (4)

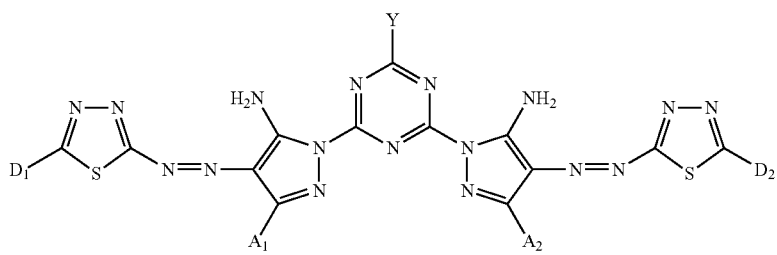

wherein in the above general formula (4), $A_1$, $A_2$, and Y are the same as $A_1$, $A_2$, and Y in the general formula (1), and $D_1$ and $D_2$ each independently represents a hydrogen atom or a substituent.

<12> The ink composition described in <11>, wherein the compound represented by the general formula (4) is a compound represented by the general formula (5);

[Chem. 5]

General formula (5)

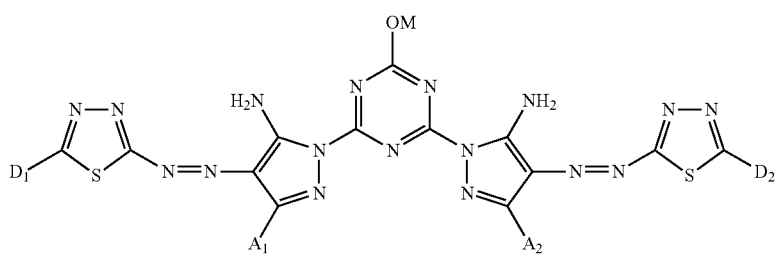

wherein in the above general formula (5), $A_1$, $A_2$, $D_1$, and $D_2$ are the same as $A_1$, $A_2$, $D_1$, and $D_2$ in the general formula (4), M is the same as M in the general formula (1).

<13> An ink composition for inkjet recording, wherein the ink composition described in any one of <1> to <12> is used.
<14> An ink set for use in an inkjet recording method, which contains the ink composition described in any one of <1> to <13> as a constituent.
<15> An ink cartridge which contains the ink composition described in any one of <1> to <13>.
<16> An ink cartridge which has the ink set described in <14> integrally or independently.
<17> An inkjet recording method of ejecting liquid droplets of an ink composition and depositing the liquid droplets onto a recording medium, which comprises conducting recording by using the ink set described in <14> or the ink cartridge described in <15> or <16>.
<18> A recorded product which is printed according to the inkjet recording method described in <17>.

Advantages of the Invention

According to the present invention, there can be provided an ink composition which, even when stored under an environment of high temperature, undergoes suppressed fading of colorants or change in color thereof and, further, forms a printed image having excellent light fastness and ozone gas fastness.

MODE FOR CARRYING OUT THE INVENTION

The present invention will be described in detail below.
The ink composition of the invention is an ink composition which contains a compound represented by the general formula (1) and a humectant having 3 or more hydroxyl groups, wherein the content of the compound represented by the general formula (1) is from 0.1% by mass to less than 7.0% by mass, the content of the humectant having 3 or more hydroxyl groups is 8.0% by mass or less, and the molar ratio of the humectant having 3 or more hydroxyl groups/the compound represented by the general formula (1) is less than 15.0.

As a preferred embodiment of the invention, there is illustrated an ink composition wherein the molar ratio of the humectant having 3 or more hydroxyl group/the compound represented by the general formula (1) is less than 15.0, more preferably less than 5.0, still more preferably from 0.01 to less than 5.0, especially preferably from 0.01 to less than 2.0, particularly preferably from 0.01 to less than 0.40. Also, as a preferred embodiment, there is illustrated an ink composition which contains a humectant having from 0 to 2 hydroxyl groups and, particularly preferably, an ink composition which contains a humectant having 0 or 1 hydroxyl group.

Also, as a still more preferred embodiment of the invention, there is illustrated an ink composition wherein the content of the humectant having 3 or more hydroxyl groups based on all of the humectants in the ink composition is less than 18% by mass, preferably less than 10% by mass, more preferably from 0.01% by mass to less than 10.0% by mass, still more preferably from 0.01% by mass to less than 4.0% by mass, especially preferably from 0.01% by mass to less than 1.0% by mass.

Hereinafter, the ink composition of the invention will be described in detail.

[Compounds Represented by the General Formula (1)]

First, a Hammett substituent constant σp value to be used in this specification is briefly explained below.

The Hammett's rule is an empirical rule advocated by L. P. Hammett in 1935 in an attempt to quantitatively discuss the influences of a substituent of a benzene derivative on the reaction or equilibrium, the validity of which has been widely accepted nowadays. Substituent constants obtained by the Hammett's rule include σp and σm values. These values are found in a number of general books. The details are given in, for example, J. A. Dean (ed.), *Lange's Handbook of Chemistry*, the 12th Ed., MacGraw-Hill, 1979 and *Kagakuno Ryoiki*, Extra No. 122, Nankodo, 1979, 96-103. While substituents are limited or described in the invention by reference to their Hammett substituent constants σp, it is needless to say that such description applies to not only the substituents whose Hammett substituent constants σp are known from the literature but those whose Hammett substituent constants σp are unknown from the literature but are to fall within a range in question when determined in accordance with the Hammett's rule. Although compounds of the invention represented by the general formulae (1) to (5) are not benzene derivatives, σp values are referred to as a measure of the electron effect of their substituents irrespective of the position of substitution. In the invention, the σp value will be used in this sence hereinafter.

Compounds represented by the general formula (1) in the invention will be described.

[Chem. 6]

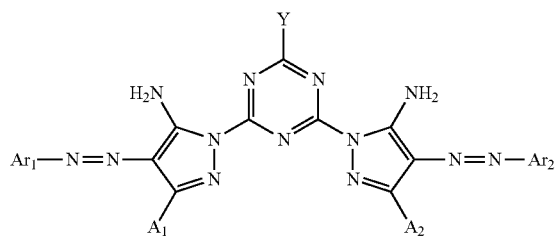

General formula (1)

$Ar_1$ and $Ar_2$ each independently represents an aromatic hydrocarbon ring group, a non-aromatic hydrocarbon ring group, an aromatic heterocyclic group or a non-aromatic heterocyclic group, which may have a substituent.

$A_1$ and $A_2$ each independently represents a hydrogen atom or a substituent which may further have a substituent.

Y represents —OM or —$NR_1R_2$, M represents a hydrogen atom or a metal ion, and $R_1$ and $R_2$ each independently represents a hydrogen atom, an alkyl group, an alkenyl group, an alkynyl group, an aralkyl group, an aryl group, or a heterocyclic group.

The foregoing general formula (1) will be described in more detail below.

$Ar_1$ and $Ar_2$ each represents an aromatic hydrocarbon ring group, a non-aromatic hydrocarbon ring group, an aromatic heterocyclic group, or a non-aromatic heterocyclic group, which may be monocyclic or may further be condensed with other ring. Each of the aforesaid rings may have a substituent and, as such substituent, there are illustrated substituents (SUB) to be described hereinafter. As the aromatic hydrocarbon ring group, there are illustrated those aryl groups which will be described hereinafter with respect to the substituents (SUB). As the non-aromatic hydrocarbon ring group, there are illustrated a cycloalkyl group and a bicycloalkyl group which will be described hereinafter with respect to the substituents (SUB). As the non-aromatic heterocyclic group, there are illustrated a piperidyl group, a piperidino group, a morpholinyl group, and a morpholino group. $Ar_1$ and $Ar_2$ each is preferably an aromatic heterocyclic group, more preferably a nitrogen-containing, 5 to 7-membered aromatic heterocyclic group, still more preferably a 5- or 6-membered aromatic heterocyclic group.

Hereinafter, preferred examples, more preferred examples, and still more preferred examples of $Ar_1$ and $Ar_2$ will be shown, but the substitution position of $Ar_1$ and $Ar_2$ to the azo group and substituents which $Ar_1$ and $Ar_2$ may have and the substitution position thereof are not limited. As preferred examples of $A_1$ and $Ar_2$, there are illustrated a phenyl group, an imidazolyl group, a benzimidazolyl group, a pyrazolyl group, a benzopyrazolyl group, a triazolyl group, a thiazolyl group, a benzothiazolyl group, an isothiazolyl group, a benzisothiazolyl group, an oxazolyl group, a benzoxazolyl group, a thiadiazolyl group, a pyrrolyl group, a benzopyrrolyl group, an indolyl group, an isoxazolyl group, a benzoisoxazolyl group, a thiophenyl group, a benzothiophenyl group, a furanyl group, a benzofuranyl group, a pyridinyl group, a quinolinyl group, an isoquinolinyl group, a pyridazinyl group, a pyrimidinyl group, a pyrazinyl group, a cinnolinyl group, a phthalazinyl group, a quinazolinyl group, a quinoxalinyl group, and a triazinyl group.

More preferred examples of $Ar_1$ and $Ar_2$ are a pyridinyl group, a pyrimidinyl group, a pyridazinyl group, a pyrrolyl group, an imidazolyl group, a pyrazolyl group, a triazolyl group, an oxazolyl group, an isoxazolyl group, a thiazolyl group, an isothiazolyl group, and a thiadiazolyl group, still more preferred examples thereof are a pyrazolyl group, a triazolyl group, an isothiazolyl group, and a thiadiazolyl group. Particularly preferred is a pyrazolyl group or a thiadiazolyl group.

These groups may further have a substituent.

As the substituent which $A_1$ and $Ar_2$ may have, there are illustrated a halogen atom, an alkyl group, an alkenyl group, an alkynyl group, an aralkyl group, an aryl group, a heterocyclic group, a cyano group, a hydroxy group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a heterocyclic thio group, a sulfamoyl group, a sulfo group, an alkyl- or aryl-sulfinyl group, an alkyl- or aryl-sulfonyl group, an acyl group, an aryloxycarbonyl group, an alkoxycarbonyl group, a carbamoyl group, an aryl or heterocyclic azo group, an imido group, a phosphino group, a phosphinyl group, a phosphonyloxy group, a phosphinylamino group, a silyl group, and an ionic hydrophilic group. More preferred are a halogen atom, an alkyl group, an aryl group, a heterocyclic group, a cyano group, an amino group, an acylamino group, and an alkyl- or aryl-sulfonyl group, and still more preferred are an alkyl group, an aryl group, a cyano group, —$SO_2CH_3$, and —$SO_2Ph$.

As $Ar_1$ and $Ar_2$, a pyrazolyl group is preferred, and the substituent thereof is an alkyl group, an aryl group, a cyano group, —$SO_2CH_3$, or —$SO_2Ph$. The substituent of the pyrazolyl group is most preferably an aryl group or a cyano group. As $Ar_1$ and $Ar_2$, a thiadiazolyl group is also preferred, and the substituent thereof is a group selected from among an alkyl group, a phenyl group, an alkoxy group, a thioalkoxy group, a phenoxy group, an alkylthio group, an arylthio group, an alkylamino group, and an arylamino group. The substituent is preferably an alkyl group, a phenyl group, an alkylthio group, an arylthio group, an alkylamino group, or an arylamino group, more preferably an alkyl group or an aryl group.

Here, the aforesaid substituents (SUB) which $Ar_1$ and $Ar_2$ may have are described in detail.

As the halogen atom, there are illustrated, for example, a fluorine atom, a chlorine atom, a bromine atom, and an iodine atom.

As the alkyl group, there are illustrated a straight, branched, or cyclic, substituted or unsubstituted alkyl group, and a cycloalkyl group, a bicycloalkyl group, and a tricyclo-structure having more rings and the like are also included. The alkyl group in those substituents which will be described hereinafter (e.g., an alkyl group in an alkoxy group or in an alkylthio group) also represents an alkyl group of such concept. To describe in detail, the alkyl group is preferably an alkyl group containing from 1 to 30 carbon atoms, more preferably from 1 to 20 carbon atoms, still more preferably from 1 to 15 carbon atoms, in a state of exclusion of the substituent. For example, there are illustrated a methyl group, an ethyl group, a n-propyl group, an isopropyl group, a t-butyl group, a n-octyl group, an eicosyl group, a 2-chloroethyl group, a 2-cyanoethyl group, and a 2-ethylhexyl group. The cycloalkyl group is preferably a substituted or unsubstituted cycloalkyl group containing from 3 to 30 carbon atoms, more preferably from 3 to 20 carbon atoms, still more preferably from 3 to 15 carbon atoms, in a state of exclusion of the substituent. As preferred examples of the cycloalkyl group, there are illustrated a cyclohexyl group, a cyclopentyl group, and a 4-n-dodecylcyclohexyl group. As the bicycloalkyl group, a substituted or unsubstituted bicycloalkyl group containing from 5 to 30 carbon atoms, in a state of exclusion of the substituent, is preferred, a bicycloalkyl group containing from 5 to 20 carbon atoms is more preferred, and a bicycloalkyl group containing from 5 to 15 carbon atoms is still more preferred. That is, there are illustrated monovalent groups formed by removing one hydrogen atom from bicycloalkanes containing from 5 to 30 carbon atoms, for example, a bicyclo[1,2,2]heptan-2-yl group and a bicyclo[2,2,2]octan-3-yl group. Examples of the substituent include a hydroxy group, an alkoxy group, a cyano group, a halogen atom, and an ionic hydrophilic group.

In addition, an aryl-substituted alkyl group (aralkyl group) is not included here.

As the alkenyl group, there are illustrated straight, branched or cyclic, substituted or unsubstituted alkenyl groups, and the alkenyl group include a cycloalkenyl group and a bicycloalkenyl group. To describe in detail, the alkenyl group is preferably a substituted or unsubstituted alkenyl group containing from 2 to 30 carbon atoms, more preferably from 2 to 20 carbon atoms, still more preferably from 2 to 15 carbon atoms, in a state of exclusion of the substituent of the alkenyl group. For example, there are illustrated a vinyl group, an allyl group, a prenyl group, a geranyl group, and an oleyl group. The cycloalkenyl group is preferably a substituted or unsubstituted cycloalkenyl group containing from 3 to 30 carbon atoms, more preferably from 3 to 20 carbon atoms, still more preferably from 3 to 15 carbon atoms, in a state of exclusion of the substituent of the cycloalkenyl group. That is, there are illustrated monovalent groups formed by removing one hydrogen atom from a cycloalkene containing from 3 to 30 carbon atoms, which are exemplified by a 2-cyclopenten-1-yl group and a 2-cyclohexen-1-yl group. The bicycloalkenyl group is preferably a substituted or unsubstituted bicycloalkenyl group containing from 5 to 30 carbon atoms, more preferably from 5 to 20 carbon atoms, still more preferably from 5 to 15 carbon atoms, in a state of exclusion of the substituent of the bicycloalkenyl group. That is, there are illustrated monovalent groups formed by removing one hydrogen atom from a bicycloalkene containing one double bond, which are exemplified by a bicyclo[2,2,1]hept-2-en-1-yl group and a bicyclo[2,2,2]oct-2-en-4-yl group. Examples of the substituent include a hydroxy group, an alkoxy group, a cyano group, a halogen atom, and an ionic hydrophilic group.

As the alkynyl group, there are illustrated substituted or unsubstituted alkynyl groups containing preferably from 2 to 30 carbon atoms, more preferably from 2 to 20 carbon atoms, still more preferably from 2 to 15 carbon atoms, in a state of exclusion of the substituent, which are exemplified by an ethynyl group, a propargyl group, and a trimethylsilylethynyl group. Examples of the substituent include a hydroxy group, an alkoxy group, a cyano group, a halogen atom, and an ionic hydrophilic group.

The aralkyl group include an aralkyl group having a substituent and an unsubstituted aralkyl group. The aralkyl group is preferably a substituted or unsubstituted aralkyl group containing from 7 to 30 carbon atoms, more preferably from 7 to 20 carbon atoms, still more preferably from 7 to 15 carbon atoms, when the substituent is excluded. Examples of the aralkyl group include a benzyl group and a 2-phenethyl group. Examples of the substituent include a hydroxy group, an alkoxy group, a cyano group, a halogen atom, and an ionic hydrophilic group.

The aryl group is preferably a substituted or unsubstituted aryl group containing from 6 to 30, more preferably from 6 to 20, still more preferably from 6 to 15 carbon atoms, in a state of exclusion of the substituent. For example, there are illustrated a phenyl group, a p-tolyl group, a naphthyl group, a m-chlorophenyl group, and an o-hexadecanoylaminophenyl group. Examples of the substituent include an alkyl group, an aryl group, a hydroxy group, an alkoxy group, a cyano group, a halogen atom, and an ionic hydrophilic group.

The heterocyclic group is preferably a monovalent group formed by removing one hydrogen atom from a 5- or 6-membered, substituted or unsubstituted, aromatic or non-aromatic heterocyclic compound, more preferably a 5- or 6-membered aromatic heterocyclic group containing from 2 to 30 carbon atoms, still more preferably from 2 to 20 carbon atoms, yet more preferably from 2 to 15 carbon atoms, in a state of exclusion of the substituent for the heterocyclic group. For example, there are illustrated a 2-furyl group, a 2-thienyl group, a 2-pyrimidinyl group, and a 2-benzothiazolyl group. Examples of the substituent include an alkyl group, an aryl group, a hydroxy group, an alkoxy group, a cyano group, a halogen atom, and an ionic hydrophilic group.

The alkoxy group is preferably a substituted or unsubstituted alkoxy group containing from 1 to 30 carbon atoms, more preferably from 1 to 20 carbon atoms, still more preferably from 1 to 15 carbon atoms, in a state of exclusion of the substituent, and is exemplified by a methoxy group, an ethoxy group, an isopropoxy group, a t-butoxy group, a n-octyloxy group, and a 2-methoxyethoxy group. Examples of the substituent include an aryl group, a hydroxy group, an alkoxy group, a cyano group, a halogen atom, and an ionic hydrophilic group.

The aryloxy group is preferably a substituted or unsubstituted aryloxy group containing from 6 to 30 carbon atoms, more preferably from 6 to 20 carbon atoms, still more preferably from 6 to 15 carbon atoms, in a state of exclusion of the substituent, and is exemplified by a phenoxy group, a 2-methylphenoxy group, a 4-t-butylphenoxy group, a 3-nitrophenoxy group, and a 2-tetradecanoylaminophenoxy group. Examples of the substituent include an alkyl group, an aryl group, a hydroxy group, an alkoxy group, a cyano group, a halogen atom, and an ionic hydrophilic group.

The silyloxy group is preferably a substituted or unsubstituted silyloxy group containing from 0 to 20 carbon atoms, more preferably from 0 to 15 carbon atoms, in a state of exclusion of the substituent, and is exemplified by a trimethylsilyloxy group and a diphenylmethylsilyloxy group. Examples of the substituent include an alkyl group, an aryl group, and a heterocyclic group.

The heterocyclic oxy group is preferably a substituted or unsubstituted heterocyclic oxy group containing from 2 to 30 carbon atoms, more preferably from 2 to 20 carbon atoms, still more preferably from 2 to 15 carbon atoms, in a state of exclusion of the substituent, and is exemplified by a 1-phenyltetrazol-5-oxy group and a 2-tetrahydropyranyloxy group. Examples of the substituent include an alkyl group, an aryl group, a hydroxy group, an alkoxy group, a cyano group, a halogen atom, and an ionic hydrophilic group.

The acyloxy group is preferably a formyloxy group, a substituted or unsubstituted alkylcarbonyloxy group containing from 2 to 30 carbon atoms excluding carbon atoms of the substituent, or a substituted or unsubstituted arylcarbonyloxy group containing from 6 to 30 carbon atoms, more preferably from 6 to 20 carbon atoms, still more preferably from 6 to 15 carbon atoms, in a state of exclusion of the substituent. For example, there are illustrated an acetyloxy group, a pivaloyloxy group, a stearoyloxy group, a benzoyloxy group, and a p-methoxyphenylcarbonyloxy group. Examples of the substituent include an alkyl group and an aryl group.

The carbamoyloxy group is preferably a substituted or unsubstituted carbamoyl group containing from 1 to 30 carbon atoms, more preferably from 1 to 20 carbon atoms, still more preferably from 1 to 15 carbon atoms, in a state of exclusion of the substituent. For example, there are illustrated an N,N-dimethylcarbamoyloxy group, an N,N-diethylcarbamoyloxy group, a morpholinocarbonyloxy group, an N,N-di-n-octylaminocarbonyloxy group, and an N-n-octylcarbamoyloxy group. Examples of the substituent include an alkyl group, an aryl group, and a heterocyclic group.

The alkoxycarbonyloxy group is preferably a substituted or unsubstituted alkoxycarbonyloxy group containing from 2 to 30 carbon atoms, more preferably from 2 to 20 carbon atoms, still more preferably from 2 to 15 carbon atoms, in a state of exclusion of the substituent. For example, there are illustrated a methoxycarbonyloxy group, an ethoxycarbonyloxy group, a t-buthoxycarbonyloxy group, and a n-octylcarbonyloxy group. Examples of the substituent include a hydroxy group, an alkoxy group, a cyano group, a halogen atom, and an ionic hydrophilic group.

The aryloxycarbonyloxy group is preferably a substituted or unsubstituted aryloxycarbonyloxy group containing from 7 to 30 carbon atoms, more preferably from 7 to 20 carbon atoms, still more preferably from 7 to 15 carbon atoms, excluding carbon atoms of the substituent. For example, there are illustrated a phenoxycarbonyloxy group, a p-methoxyphenoxycarbonyloxy group, and a p-n-hexadecyloxyphenoxy carbonyloxy group. Examples of the substituent include an alkyl group, a hydroxy group, an alkoxy group, a cyano group, a halogen atom, and an ionic hydrophilic group.

The amino group includes an alkylamino group, an arylamino group, and a heterocyclic amino group, and is preferably an amino group or a substituted or an unsubstituted alkylamino group containing from 1 to 30 carbon atoms, more preferably from 1 to 20 carbon atoms, still more preferably from 1 to 15 carbon atoms, in a state of exclusion of the substituent, or an arylamino group containing from 6 to 30, more preferably from 6 to 20 carbon atoms, still more preferably from 6 to 15 carbon atoms, in a state of the substituent. For example, there are illustrated a methylamino group, a dimethylamino group, an anilino group, an N-methyl-anilino group, and a diphenylamino group. Examples of the substituent include an alkyl group, an aryl group, a heterocyclic group, a hydroxy group, an alkoxy group, a cyano group, a halogen atom, and an ionic hydrophilic group.

The acylamino group is preferably a formylamino group, a substituted or unsubstituted alkylcarbonylamino group containing from 1 to 30 carbon atoms, more preferably from 1 to 20 carbon atoms, still more preferably from 1 to 15 carbon atoms, in a state of exclusion of the substituent, or a substituted or unsubstituted arylcarbonylamino group containing from 6 to 30 carbon atoms, more preferably from 6 to 20 carbon atoms, still more preferably from 6 to 15 carbon atoms, in a state of exclusion of the substituent. For example, there are illustrated an acetylamino group, a pivaloylamino group, a lauroylamino group, a benzoylamino group, and a 3,4,5-tri-n-octyloxyphenylcarbonylamino group. Examples of the substituent include a hydroxy group, an alkoxy group, a cyano group, a halogen atom, and an ionic hydrophilic group.

The aminocarbonylamino group is preferably a substituted or unsubstituted ureido group containing from 1 to 30 carbon atoms, more preferably from 1 to 20 carbon atoms, still more preferably from 1 to 15 carbon atoms, in a state of exclusion of the substituent. For example, there are illustrated a ureido group, an N,N-dimethylureido group, and an N,N-diethylureido group, a morpholinocarbonylamino group. Examples of the substituent include an alkyl group, an aryl group, and a heterocyclic group.

The alkoxycarbonylamino group is preferably a substituted or unsubstituted alkoxycarbonylamino group containing from 2 to 30 carbon atoms, more preferably from 2 to 20 carbon atoms, still more preferably from 2 to 15 carbon atoms, in a state of exclusion of the substituent. For example, there are illustrated a methoxycarbonylamino group, an ethoxycarbonylamino group, a t-buthoxycarbonylamino group, a n-octadecyloxycarbonylamino group, and an N-methyl-methoxycarbonylamino group. Examples of the substituent include a hydroxy group, an alkoxy group, a cyano group, a halogen atom, and an ionic hydrophilic group.

The aryloxycarbonylamino group is preferably a substituted or unsubstituted aryloxycarbonylamino group containing from 7 to 30 carbon atoms, more preferably from 7 to 20 carbon atoms, still more preferably from 7 to 15 carbon atoms, in a state of exclusion of the substituent. For example, there are illustrated a phenoxycarbonylamino group, a p-chlorophenoxycarbonylamino group, and a m-n-octyloxyphenoxycarbonylamino group. Examples of the substituent include a hydroxy group, an alkoxy group, a cyano group, a halogen atom, and an ionic hydrophilic group.

The sulfamoylamino group is preferably a substituted or unsubstituted sulfamoylamino group containing from 0 to 30 carbon atoms, more preferably from 0 to 20 carbon atoms, still more preferably from 0 to 15 carbon atoms, in a state of exclusion of the substituent. For example, there are illustrated a sulfamoylamino group, an N,N-dimethylaminosulfonylamino group, and an N-n-octylaminosulfonylamino group. Examples of the substituent include an alkyl group, an aryl group, and a heterocyclic group.

The alkyl- or aryl-sulfonylamino group is preferably a substituted or unsubstituted alkylsulfonylamino group containing from 1 to 30 carbon atoms, more preferably from 1 to 20 carbon atoms, still more preferably from 1 to 15 carbon atoms, in a state of exclusion of the substituent, or a substituted or unsubstituted arylsulfonylamino group containing from 6 to 30 carbon atoms, more preferably from 6 to 20 carbon atoms, still more preferably from 6 to 15 carbon atoms. For example, there are illustrated a methylsulfonylamino group, a butylsulfonylamino group, a phenylsulfonylamino group, a 2,3,5-trichlorophenylsulfonylamino group, and a p-methylphenylsulfonylamino group. Examples of the substituent include a hydroxy group, an alkoxy group, a cyano group, a halogen atom, and an ionic hydrophilic group.

The alkylthio group is preferably a substituted or unsubstituted alkylthio group containing from 1 to 30 carbon atoms, more preferably from 1 to 20 carbon atoms, still more preferably from 1 to 15 carbon atoms, in a state of exclusion of the substituent. For example, there are illustrated a methylthio group, an ethylthio group, and a n-hexadecylthio group. Examples of the substituent include an aryl group, a hydroxy group, an alkoxy group, a cyano group, a halogen atom, and an ionic hydrophilic group.

The arylthio group is preferably a substituted or unsubstituted arylthio group containing from 6 to 30 carbon atoms, more preferably from 6 to 20 carbon atoms, still more preferably from 6 to 15 carbon atoms, in a state of exclusion of the substituent. For example, there are illustrated a phenylthio group, a p-chlorophenylthio group, and a m-methoxyphenylthio group. Examples of the substituent include an alkyl group, an aryl group, a hydroxy group, an alkoxy group, a cyano group, a halogen atom, and an ionic hydrophilic group.

The heterocyclic thio group is preferably a substituted or unsubstituted heterocyclic thio group containing from 2 to 30 carbon atoms, more preferably from 2 to 20 carbon atoms, still more preferably from 2 to 15 carbon atoms, in a state of exclusion of the substituent. For example, there are illustrated a 2-benzothiazolylthio group and a 1-phenyltetrazol-5-ylthio group. Examples of the substituent include an alkyl group, an aryl group, a hydroxy group, an alkoxy group, a cyano group, a halogen atom, and an ionic hydrophilic group.

The sulfamoyl group is preferably a substituted or unsubstituted sulfamoyl group containing from 0 to 30 carbon atoms, more preferably from 0 to 20 carbon atoms, still more preferably from 0 to 15 carbon atoms, in a state of exclusion of the substituent. For example, there are illustrated an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, and an N—(N'-phenylcarbamoyl)sulfamoyl group. Examples of the substituent include an alkyl group, an aryl group, and a heterocyclic group.

The alkyl- or aryl-sulfinyl group is preferably a substituted or unsubstituted alkylsulfinyl group containing from 1 to 30 carbon atoms, more preferably from 1 to 20 carbon atoms, still more preferably from 1 to 15 carbon atoms, in a state of exclusion of the substituent, or a substituted or unsubstituted arylsulfinyl group containing from 6 to 30 carbon atoms, more preferably from 6 to 20 carbon atoms, still more preferably from 6 to 15 carbon atoms, in a state of exclusion of the substituent. For example, there are illustrated a methylsulfinyl group, an ethylsulfinyl group, a phenylsulfinyl group, and a p-methylphenylsulfinyl group. Examples of the substituent include a hydroxy group, an alkoxy group, a cyano group, a halogen atom, and an ionic hydrophilic group.

The alkyl- or aryl-sulfonyl group is preferably a substituted or unsubstituted alkylsulfonyl group containing from 1 to 30 carbon atoms, more preferably from 1 to 20 carbon atoms, still more preferably from 1 to 15 carbon atoms, in a state of exclusion of the substituent, or a substituted or unsubstituted arylsulfonyl group containing from 6 to 30 carbon atoms, more preferably from 6 to 20 carbon atoms, still more preferably from 6 to 15 carbon atoms, in a state of exclusion of the substituent. For example, there are illustrated a methylsulfonyl group, an ethylsulfonyl group, a phenylsulfonyl group, and a p-methylphenylsulfonyl group. Examples of the substituent include a hydroxy group, an alkoxy group, a cyano group, a halogen atom, and an ionic hydrophilic group.

The acyl group is preferably a formyl group, a substituted or unsubstituted alkylcarbonyl group containing from 2 to 30 carbon atoms, more preferably from 2 to 20 carbon atoms, still more preferably from 2 to 15 carbon atoms, in a state of exclusion of the substituent, a substituted or unsubstituted arylcarbonyl group containing from 7 to 30 carbon atoms, more preferably from 7 to 20 carbon atoms, still more preferably from 7 to 15 carbon atoms, in a state of exclusion of the substituent, or a substituted or unsubstituted heterocyclic carbonyl group wherein the carbonyl group is connected through the carbon atom and which contains from 2 to 30 carbon atoms, more preferably from 2 to 20 carbon atoms, still more preferably from 2 to 15 carbon atoms, in a state of exclusion of the substituent. For example, there are illustrated an acetyl group, a pivaloyl group, a 2-chloroacetyl group, a stearoyl group, a benzoyl group, a p-n-octyloxyphenylcarbonyl group, a 2-pyridylcarbonyl group, and a 2-furylcarbonyl group. Examples of the substituent include an alkyl group, an aryl group, and a heterocyclic group.

The aryloxycarbonyl group is preferably a substituted or unsubstituted aryloxycarbonyl group containing from 7 to 30 carbon atoms, more preferably from 7 to 20 carbon atoms, still more preferably from 7 to 15 carbon atoms, in a state of exclusion of the substituent for the aryloxycarbonyl group. For example, there are illustrated a phenoxycarbonyl group, an o-chlorophenoxycarbonyl group, a m-nitrophenoxycarbonyl group, and a p-t-butylphenoxycarbonyl group. Examples of the substituent include a hydroxy group, an alkoxy group, a cyano group, a halogen atom, and an ionic hydrophilic group.

The alkoxycarbonyl group is preferably a substituted or unsubstituted alkoxycarbonyl group containing from 2 to 30 carbon atoms, more preferably from 2 to 20 carbon atoms, still more preferably from 2 to 15 carbon atoms, in a state of exclusion of the substituent for the alkoxycarbonyl group. For example, there are illustrated a methoxycarbonyl group, an ethoxycarbonyl group, a t-butoxycarbonyl group, and a n-octadecyloxycarbonyl group. Examples of the substituent include a hydroxy group, an alkoxy group, a cyano group, a halogen atom, and an ionic hydrophilic group.

The carbamoyl group is preferably a substituted or unsubstituted carbamoyl group containing from 1 to 30 carbon atoms, more preferably from 1 to 20 carbon atoms, still more preferably from 1 to 15 carbon atoms, in a state of exclusion of the substituent for the carbamoyl group. For example, there are illustrated a carbamoyl group, an N-methylcarbamoyl group, an N,N-dimethylcarbamoyl group, an N,N-di-n-octylcarbamoyl group, and an N-(methylsulfonyl)carbamoyl group. Examples of the substituent include an alkyl group, an aryl group, and a heterocyclic group.

The aryl or heterocyclic azo group is preferably a substituted or unsubstituted arylazo group containing from 6 to 30 carbon atoms, more preferably from 6 to 20 carbon atoms, still more preferably from 6 to 15 carbon atoms, in a state of exclusion of the substituent, or a substituted or unsubstituted heterocyclic azo group containing from 3 to 30 carbon atoms, more preferably from 3 to 20 carbon atoms, still more preferably from 3 to 15 carbon atoms, in a state of exclusion of the substituent. For example, there are illustrated phenylazo, p-chlorophenylazo, and 5-ethylthio-1,3,4-thiadiazol-2-ylazo. Examples of the substituent include a hydroxy group, an alkoxy group, a cyano group, a halogen atom, and an ionic hydrophilic group.

The imido group is preferably a substituted or unsubstituted imido group containing from 0 to 30 carbon atoms, more preferably from 0 to 20 carbon atoms, still more preferably from 0 to 15 carbon atoms, in a state of exclusion of the substituent for the imido group. For example, there are illustrated an N-succinimido group and an N-phthalimido group. Examples of the substituent include an alkyl group, an aryl group, and a heterocyclic group.

The phosphino group is preferably a substituted or unsubstituted phosphino group containing from 0 to 30 carbon atoms, more preferably from 0 to 20 carbon atoms, still more preferably from 0 to 15 carbon atoms, in a state of exclusion of the substituent. For example, there are illustrated a dimethylphosphino group, a diphenylphosphino group, and a methylphenoxyphosphino group.

The phosphinyl group is preferably a substituted or unsubstituted phosphinyl group containing from 0 to 30 carbon atoms, more preferably from 0 to 20 carbon atoms, still more preferably from 0 to 15 carbon atoms, in a state of exclusion of the substituent. For example, there are illustrated a phosphinyl group, a dioctyloxyphosphinyl group, and a diethoxyphosphinyl group. Examples of the substituent include an alkyl group, an aryl group, and a heterocyclic group.

The phosphinyloxy group is preferably a substituted or unsubstituted phosphinyloxy group containing from 0 to 30 carbon atoms, more preferably from 0 to 20 carbon atoms, still more preferably from 0 to 15 carbon atoms, in a state of exclusion of the substituent. For example, there are illustrated a diphenoxyphosphinyloxy group and a dioctyloxyphosphinyloxy group. Examples of the substituent include an alkyl group, an aryl group, and a heterocyclic group.

The phosphinylamino group is preferably a substituted or unsubstituted phosphinylamino group containing from 0 to 30 carbon atoms, more preferably from 0 to 20 carbon atoms, still more preferably from 0 to 15 carbon atoms, in a state of exclusion of the substituent. For example, there are illustrated a dimethoxyphosphinylamino group and a dimethylaminophosphinylamino group. Examples of the substituent include an alkyl group, an aryl group, and a heterocyclic group.

The silyl group is preferably a substituted or unsubstituted silyl group containing from 0 to 30 carbon atoms, more preferably from 0 to 20 carbon atoms, still more preferably from 0 to 15 carbon atoms, in a state of exclusion of the substituent. For example, there are illustrated a trimethylsilyl group, a t-butyldimethylsilyl group, and a phenyldimethylsilyl group. Examples of the substituent include an alkyl group, an aryl group, and a heterocyclic group.

The ionic hydrophilic group include a sulfo group, a carboxyl group, a phosphono group, and a quaternary ammonium group. As the ionic hydrophilic group, a carboxyl group and a sulfo group are preferred, and a carboxyl group is particularly preferred. The carboxyl group and the sulfo group may be in a salt form, and examples of a counter ion for forming the salt include an alkali metal ion (e.g., lithium ion, sodium ion, or potassium ion) and an organic cation (e.g., tetramethylguanidium ion).

As examples of a salt-form ionic hydrophilic group, there are illustrated lithium sulfonate, potassium sulfonate, and tetramethylammonium chloride.

Of the above-described substituents, those which have a hydrogen atom may be substituted at the hydrogen atom by the above-described substituent. As examples of such substituent, there are illustrated an alkylcarbonylaminosulfonyl group, an arylcarbonylaminosulfonyl group, and an alkylsulfonylaminocarbonyl group, an arylsulfonylaminocarbonyl group. As specific examples thereof, there are illustrated a methylsulfonylaminocarbonyl group, a p-methylphenylsulfonylaminocarbonyl group, an acetylaminosulfonyl group, and a benzoylaminosulfonyl group.

$A_1$ and $A_2$ each independently represents a hydrogen atom or a substituent. As the substituent, those may be applied which are described with respect to the foregoing substituent (SUB). $A_1$ and $A_2$ each preferably represents a hydrogen atom, a halogen atom, an alkyl group, an alkenyl group, an alkynyl group, an aralkyl group, an aryl group, a heterocyclic group, a cyano group, a hydroxy group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a heterocyclic thio group, a sulfamoyl group, a sulfo group, an alkyl- or aryl-sulfinyl group, an alkyl- or aryl-sulfonyl group, an acyl group, an aryloxycarbonyl group, an alkoxycarbonyl group, a carbamoyl group, an aryl or heterocyclic azo group, an imido group, a phosphino group, a phosphinyl group, a phosphinyloxy group, a phosphinylamino group, a silyl group, or an ionic hydrophilic group, more preferably represents a hydrogen atom, a halogen atom, an alkyl group, an alkenyl group, an alkynyl group, an aryl group, a heterocyclic group, a hydroxy group, an alkoxy group, an aryloxy group, a heterocyclic oxy group, an amino group, an amino group substituted by an alkyl group, aryl group or heterocyclic group, a thio group, an alkyl- or aryl-thio group, a heterocyclic thio group, or an ionic hydrophilic group. Of these, preferred examples of $A_1$ and $A_2$ are a hydrogen atom, an alkyl group containing a total of from 1 to 8 carbon atoms, and an aryl group containing a total of from 6 to 12 carbon atoms, and a hydrogen atom, an isopropyl group, a sec-butyl group, and a tert-butyl group are most preferred. Each group may further have a substituent.

Y represents —OM or —$NR_1R_2$, M represents a hydrogen atom or a metal ion, and $R_1$ and $R_2$ each independently represents a hydrogen atom, an alkyl group, an alkenyl group, an alkynyl group, an aralkyl group, an aryl group, or a heterocyclic group. Y is preferably —OM. M is preferably a hydrogen atom or an alkali metal ion, more preferably an alkali metal ion. Of the alkali metal ions, lithium ion, sodium ion, and potassium ion are more preferred, and lithium ion and potassium ion are still more preferred. In the case where Y is —$NR_1R_2$, those groups may be applied as $R_1$ and $R_2$, respectively, which are corresponding groups described with respect to the foregoing substituents (SUB). As $R_1$ and $R_2$, a hydrogen atom, an alkyl group, and an aryl group are more preferred, a hydrogen atom or an alkyl group are still more preferred, and a hydrogen atom is particularly preferred.

To sum up the above description, compounds of the invention represented by the general formula (1) preferably comprise the following combination of (a) to (c).

(a) $Ar_1$ and $Ar_2$ each independently represents, preferably, a pyrazolyl group, a thiazolyl group, an isothiazolyl group, or a thiadiazolyl group, particularly preferably a pyrazolyl group or a thiadiazolyl group. The substituent for the pyrazolyl group is preferably an alkyl group, an aryl group, a cyano group, —$SO_2CH_3$ or —$SO_2Ph$, most preferably an aryl group or a cyano group. The substituent for the thiadiazolyl group is preferably an alkyl group or an aryl group.

(b) $A_1$ and $A_2$ each independently represents, preferably, a hydrogen atom, an alkyl group containing a total of from 1 to 8 carbon atoms, or an aryl group containing a total of from 6 to 12 carbon atoms, more preferably a hydrogen atom, an isopropyl group, a sec-butyl group, or a tert-butyl group, most preferably a t-butyl group.

(c) Y represents —OM or —$NR_1R_2$, preferably —OM. M is preferably an alkali metal ion and, of the alkali metal ions, lithium ion and potassium ion are more preferred. $R_1$ and $R_2$ each independently is preferably a hydrogen atom or an alkyl group, particularly preferably a hydrogen atom.

Additionally, as compounds represented by the general formula (1), those compounds are preferred wherein at least one of the various substituents thereof is a member of the aforesaid preferred groups, those compounds are more preferred wherein more of the various substituents thereof are members of the aforesaid preferred groups, and those compounds are most preferred wherein all substituents thereof are members of the aforesaid preferred groups.

Of the compounds represented by the general formula (1), compounds represented by the following general formula (2) are more preferred.

[Chem. 7]

General formula (2)

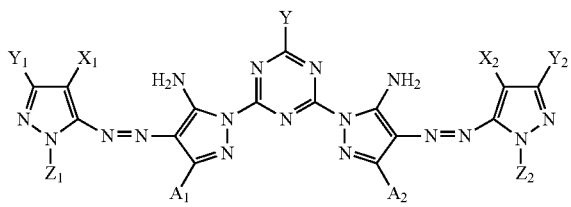

In the above general formula (2), $A_1$, $A_2$, and Y are the same as $A_1$, $A_2$, and Y in the general formula (1). $Y_1$ and $Y_2$ each independently represents a hydrogen atom or a substituent.

$X_1$ and $X_2$ each independently represents an electron-withdrawing group having a Hammett σp value of 0.20 or more.

$Z_1$ and $Z_2$ each independently represents a hydrogen atom, an alkyl group, an alkenyl group, an alkynyl group, an aralkyl group, an aryl group, or a heterocyclic group.

Groups in the general formula (2) will be described in detail below.

$A_1$, $A_2$, and Y are the same as $A_1$, $A_2$, and Y in the general formula (1).

$Y_1$ and $Y_2$ each preferably is a hydrogen atom, a halogen atom, an alkyl group, an alkenyl group, an alkynyl group, an aralkyl group, an aryl group, a heterocyclic group, a cyano group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group, an amino group substituted by an alkyl group, an aryl group or a heterocyclic group, an acylamino group, a sulfamoylamino group, an alkoxycarbonylamino group, an alkyl- or aryl-sulfonylamino group, an aryloxycarbonylamino group, a nitro group, a thio group, an alkyl- or aryl-thio group, an acylthio group, a carbamoylthio group, a heterocyclic thio group, an alkoxycarbonylthio group, an aryloxycarbonylthio group, an alkyl- or aryl-sulfinyl group, a sulfamoyl group, an ionic hydrophilic group, or an acylamino group. Description on the foregoing substituents (SUB) corresponding to respective groups described above may be applied to the respective groups described above.

$Y_1$ and $Y_2$ each more preferably is a hydrogen atom, a halogen atom, an alkyl group, an aryl group, a heterocyclic group, a cyano group, an alkoxy group, an acylamino group, an aminocarbonylamino group, an alkylsulfonylamino group, an arylsulfonylamino group, a sulfamoyl group, an alkylsulfonyl group, an arylsulfonyl group, a carbamoyl group, or an alkoxycarbonyl group, particularly preferably a hydrogen atom, a halogen atom, an alkyl group, an aryl group, a cyano group, an alkylsulfonyl group, an arylsulfonyl group, or a heterocyclic group, and is most preferably a hydrogen atom.

As $X_1$ and $X_2$ having a substituent σp value of 0.20 or more, there are illustrated preferably an acyl group, an acyloxy group, a carboxyl group, a carbamoyl group, an alkoxycarbonyl group, an aryloxycarbonyl group, a cyano group, a nitro group, a dialkylphosphono group, a diarylphosphono group, an alkylthio group, an arylthio group, an alkylsulfinyl group, an arylsulfinyl group, an alkylsulfonyl group, an arylsulfonyl group, a sulfonyloxy group, an acylthio group, a sulfamoyl group, a thiocyanato group, a thiocarbonyl group, a halogenated alkyl group, a halogenated alkoxy group, a halogenated aryloxy group, a halogenated alkylamino group, a halogenated alkylthio group, an aryl group substituted by other substituent having a σp value of 0.20 or more, a heterocyclic group, a halogen atom, an azo group, and a selenocyanato group. Description on the foregoing substituents (SUB) corresponding to respective groups described above may be applied to the respective groups described above.

Preferred $X_1$ and $X_2$ are a cyano group, a carbamoyl group, an alkoxycarbonyl group, an alkylsulfonyl group, an arylsulfonyl group, and a halogen atom, more preferred $X_1$ and $X_2$ are a cyano group, an alkoxycarbonyl group, an alkylsulfonyl group, and an arylsulfonyl group, and most preferred are a cyano group, an alkylsulfonyl group, and an arylsulfonyl group. Of these, a cyano group is most preferred.

As $Z_1$ and $Z_2$, there are preferably illustrated an alkyl group, a cycloalkyl group, an aralkyl group, an alkenyl group, an alkynyl group, an aryl group, a heterocyclic group, an alkylsulfinyl group, an arylsulfinyl group, an alkylsulfonyl group, an arylsulfonyl group, an acyl group, an aryloxy group, an aryloxycarbonyl group, an alkoxycarbonyl group, a carbamoyl group, a phosphino group, a phosphinyl group, and a silyl group. Each of these groups may further have a substituent.

As $Z_1$ and $Z_2$, an alkyl group, an aryl group, a heterocyclic group, an alkylsulfonyl group, an arylsulfonyl group, an acyl group, an arylcarbonyl group, and a carbamoyl group are more preferred, and a substituted aryl group is still more preferred.

To sum up the above description, compounds of the invention represented by the general formula (2) preferably comprise the following combination of (a) to (e).

(a) $Y_1$ and $Y_2$ each independently is, particularly preferably, a hydrogen atom, a halogen atom, an alkyl group, an aryl group, a cyano group, an alkylsulfonyl group, an arylsulfonyl group, or a heterocyclic group, most preferably a hydrogen atom.

(b) $A_1$ and $A_2$ each independently is, preferably, a hydrogen atom, an alkyl group containing a total of from 1 to 8 carbon atoms, or an aryl group containing a total of from 6 to 12 carbon atoms, more preferably an isopropyl group, a sec-butyl group, or a tert-butyl group, most preferably a tert-butyl group.

(c) $X_1$ and $X_2$ each independently is, preferably, a cyano group, an alkylsulfonyl group, or an arylsulfonyl group, more preferably a cyano group.

(d) $Z_1$ and $Z_2$ each independently is, more preferably an alkyl group, an aryl group, a heterocyclic group, an alkylsulfonyl group, an arylsulfonyl group, an acyl group, an arylcarbonyl group, or a carbamoyl group, still more preferably a substituted aryl group. The substituted aryl group is preferably a phenyl group having at least two (preferably 2) sulfo groups or carboxyl groups as substituents.
(e) Y is preferably —OM. M is preferably an alkali metal ion and, of the alkali metal ions, lithium ion or potassium ion is still more preferred.

Additionally, as compounds represented by the general formula (2), those compounds are preferred wherein at least one of the various substituents thereof is a member of the aforesaid preferred groups, those compounds are more preferred wherein more of the various substituents thereof are members of the aforesaid preferred groups, and those compounds are most preferred wherein all substituents thereof are members of the aforesaid preferred groups.

Of the compounds represented by the general formula (2), compounds represented by the following general formula (3) are still more preferred.

[Chem. 8]

General formula (3)

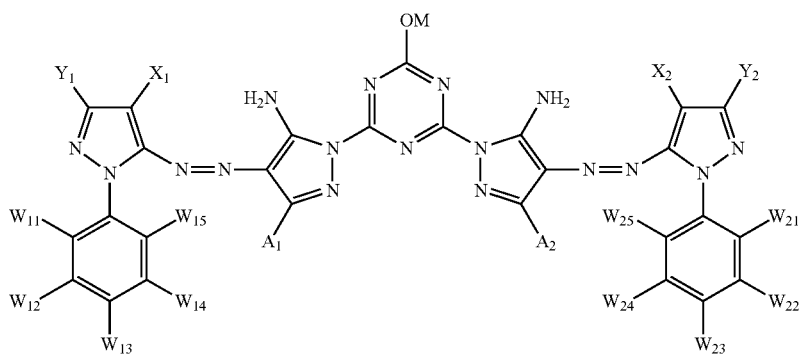

In the above general formula (3), $A_1$, $A_2$, $X_1$, $X_2$, $Y_1$, and $Y_2$ are the same as $A_1$, $A_2$, $X_1$, $X_2$, $Y_1$, and $Y_2$ in the general formula (2). $W_{11}$, $W_{12}$, $W_{13}$, $W_{14}$, $W_{15}$, $W_{21}$, $W_{22}$, $W_{23}$, $W_{24}$, and $W_{25}$ each independently represents a hydrogen atom or a substituent.

M represents a hydrogen atom or a metal ion.

Groups in the general formula (3) will be described in detail below.

$A_1$, $A_2$ are the same as described in detail with respect to the general formula (1).

$Y_1$ and $Y_2$ are the same as described in detail with respect to the general formula (2).

$X_1$ and $X_2$ are the same as described in detail with respect to the general formula (2).

$W_{11}$, $W_{12}$, $W_{13}$, $W_{14}$, $W_{15}$, $W_{21}$, $W_{22}$, $W_{23}$, $W_{24}$, and $W_{25}$ each is, preferably, a hydrogen atom, a halogen atom, an alkyl group, an aryl group, a heterocyclic group, a cyano group, an alkoxy group, an acylamino group, an aminocarbonylamino group, an alkylsulfonylamino group, an arylsulfonylamino group, a sulfamoyl group, an alkylsulfonyl group, an arylsulfonyl group, a carbamoyl group, an alkoxycarbonyl group, a sulfo group (including a salt thereof), a carboxyl group (including a salt thereof), a hydroxyl group (which may be in a salt form), a phosphono group (which may be in a salt form), or a quaternary ammonium. Of these, a hydrogen atom, a halogen atom, an alkyl group, a sulfo group (including a salt thereof), a carboxyl group (including a salt thereof), and a hydroxyl group (which may be in a salt form) are more preferred, a hydrogen atom, a sulfo group (including a salt thereof), and a carboxyl group (including a salt thereof) are still more preferred. In particular, compounds wherein at least one of $W_{11}$, $W_{12}$, $W_{13}$, $W_{14}$, and $W_{15}$, is a sulfo group (including a salt thereof) or a carboxyl group (including a salt thereof) and at least one of $W_{21}$, $W_{22}$, $W_{23}$, $W_{24}$, and $W_{25}$ is a sulfo group (including a salt thereof) or a carboxyl group (including a salt thereof) are preferred. Compounds wherein two of $W_{11}$ to $W_{15}$ and two of $W_{21}$ to $W_{25}$ are carboxyl groups (including salts thereof) and other members are hydrogen atoms are preferred. Description on the foregoing substituents (SUB) corresponding to respective groups of a halogen atom, an alkyl group, an an aryl group, a heterocyclic group, a cyano group, an alkoxy group, an acylamino group, an aminocarbonylamino group, an alkylsulfonylamino group, an arylsulfonylamino group, a sulfamoyl group, an alkylsulfonyl group, an arylsulfonyl group, a carbamoyl group, and an alkoxycarbonyl group may be applied to the respective groups described above.

M represents a hydrogen atom or a metal ion, more preferably a hydrogen atom or an alkali metal ion, still more preferably an alkali metal ion. Of the alkali metal ions, lithium ion, sodium ion, and potassium ion are more preferred, and lithium ion and potassium ion are most preferred.

To sum up the above description, compounds of the invention represented by the general formula (3) preferably comprise the following combination of (a) to (e).
(a) $Y_1$ and $Y_2$ each independently is, particularly preferably, a hydrogen atom, a halogen atom, an alkyl group, an aryl group, a cyano group, an alkylsulfonyl group, an arylsulfonyl group, or a heterocyclic group, more preferably a hydrogen atom or an alkyl group, most preferably a hydrogen atom.
(b) $A_1$ and $A_2$ each independently is, preferably, a hydrogen atom, an alkyl group containing a total of from 1 to 8 carbon atoms, or an aryl group containing a total of from 6 to 12 carbon atoms, more preferably an isopropyl group, a sec-butyl group, or a tert-butyl group, most preferably a tert-butyl group.
(c) $X_1$ and $X_2$ each independently is, preferably, a cyano group, an alkylsulfonyl group, or an arylsulfonyl group, more preferably a cyano group.
(d) $W_{11}$, $W_{12}$, $W_{13}$, $W_{14}$, $W_{15}$, $W_{21}$, $W_{22}$, $W_{23}$, $W_{24}$, and $W_{25}$ each is, preferably, a hydrogen atom, a sulfo group (including a salt thereof), and a carboxyl group (including a salt thereof). In particular, compounds wherein at least one of $W_{11}$, $W_{12}$, $W_{13}$, $W_{14}$, and $W_{15}$, is a sulfo group (including a salt thereof) or a carboxyl group (including a salt thereof) and at least one of $W_{21}$, $W_{22}$, $W_{23}$, $W_{24}$, and $W_{25}$ is a sulfo group (including a salt thereof) or a carboxyl group (including a salt thereof) are preferred. Compounds wherein two of $W_{11}$ to $W_{15}$ and two of $W_{21}$ to $W_{25}$ are carboxyl groups (including salts thereof) are preferred.

(e) M is preferably an alkali metal ion and, of the alkali metal ions, lithium ion or potassium ion is still more preferred.

Additionally, as compounds represented by the general formula (3), those compounds are preferred wherein at least one of the various substituents thereof is a member of the aforesaid preferred groups, those compounds are more preferred wherein more of the various substituents thereof are members of the aforesaid preferred groups, and those compounds are most preferred wherein all substituents thereof are members of the aforesaid preferred groups.

Of the compounds represented by the general formula (1), compounds represented by the following general formula (4) are still more preferred.

[Chem. 9]

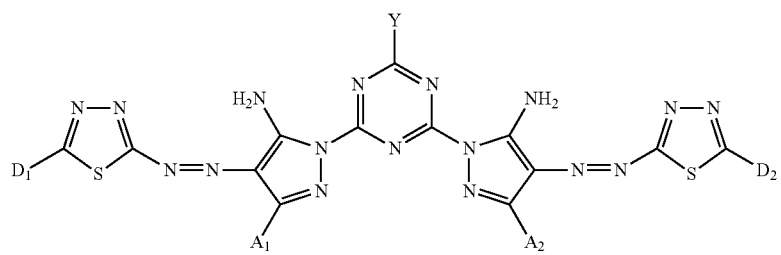

General formula (4)

In the above general formula (4), $A_1$, $A_2$, and Y are the same as $A_1$, $A_2$, and Y in the general formula (1). $D_1$ and $D_2$ each independently represents a hydrogen atom or a substituent.

Substituents will be described in detail below.

$A_1$, $A_2$ are the same as described in detail with respect to the general formula (1).

Y is the same as described in detail with respect to the general formula (1).

$D_1$ and $D_2$ each is, preferably, a hydrogen atom, an alkyl group, a cycloalkyl group, an aralkyl group, an alkenyl group, an alkynyl group, an aryl group, a heterocyclic group, a cyano group, a hydroxy group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (an alkylamino group, an arylamino group), an acylamino group (an amido group), an aminocarbonylamino group (a ureido group), an alkoxycarbonylamino group, an aryloxycarbonylamino group, a sulfamoylamino group, an alkylsulfonylamino group, an arylsulfonylamino group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkyloxycarbonyl group, a carbamoyl group, a phosphino group, a phosphinyl group, a phosphinyloxy group, a phosphinylamino group, a silyl group, an azo group, or an imido group. Description on the foregoing substituents (SUB) corresponding to respective groups described above may be applied to the respective groups described above. Each of the above-described groups may further have a substituent.

$D_1$ and $D_2$ each independently is, preferably, a substituted alkyl group, a substituted aryl group, a substituted heterocyclic group, a substituted alkylthio group, a substituted arylthio group, a substituted heterocyclic thio group, a substituted alkylamino group, a substituted arylamino group, or a substituted heterocyclic group. Of these, a substituted aryl group and a substituted arylthio group are preferred, and a substituted aryl group is particularly preferred. The substituted aryl group is preferably a phenyl group having at least 2 (preferably 2) sulfo groups or carboxyl groups.

To sum up the above description, compounds of the invention represented by the general formula (4) preferably comprise the following combination of (a) to (c).

(a) $A_1$ and $A_2$ each independently is, preferably, a hydrogen atom, an alkyl group containing a total of from 1 to 8 carbon atoms, or an aryl group containing a total of from 6 to 12 carbon atoms, more preferably an isopropyl group, a sec-butyl group, or a tert-butyl group, most preferably a tert-butyl group.

(b) $D_1$ and $D_2$ each independently is, preferably, a substituted alkyl group, a substituted aryl group, a substituted heterocyclic group, a substituted alkylthio group, a substituted arylthio group, or a substituted heterocyclic thio group. Of these, a substituted aryl group and a substituted arylthio group are preferred, and a substituted aryl group is particularly preferred. The substituted aryl group is preferably a phenyl group having at least 2 (preferably 2) sulfo groups or carboxyl groups.

(c) Y is preferably —OM. M is preferably an alkali metal ion, more preferably an alkali metal ion. Of the alkali metal ions, lithium ion, sodium ion, and potassium ion are more preferred, and lithium ion and potassium ion are still more preferred.

Additionally, as compounds represented by the general formula (4), those compounds are preferred wherein at least one of the various substituents thereof is a member of the aforesaid preferred groups, those compounds are more preferred wherein more of the various substituents thereof are members of the aforesaid preferred groups, and those compounds are most preferred wherein all substituents thereof are members of the aforesaid preferred groups.

Of the compounds represented by the general formula (4), compounds represented by the following general formula (5) are more preferred.

[Chem. 10]

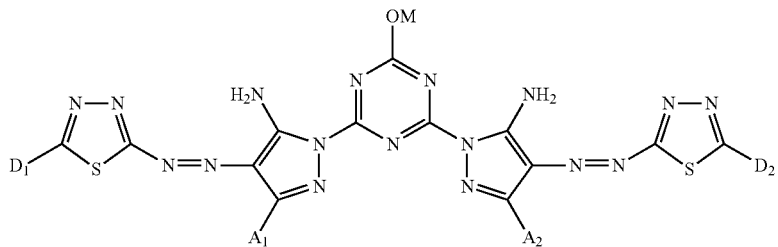

General formula (5)

In the above general formula (5), $A_1$, $A_2$, $D_1$, and $D_2$ are the same as $A_1$, $A_2$, $D_1$, and $D_2$ in the general formula (4). M is the same as M in the general formula (1).

Substituents in the general formula (5) will be described in detail below.

$A_1$ and $A_2$ are the same as are described in detail with respect to the general formula (1).

$D_1$ and $D_2$ are the same as are described in detail with respect to the general formula (4).

M is the same as is described in detail with respect to the general formula (1).

To sum up the above description, compounds of the invention represented by the general formula (5) preferably comprise the following combination of (a) to (c).

(a) $A_1$ and $A_2$ each independently is, preferably, a hydrogen atom, an alkyl group containing a total of from 1 to 8 carbon atoms, or an aryl group containing a total of from 6 to 12 carbon atoms, more preferably an isopropyl group, a sec-butyl group, or a tert-butyl group, most preferably a tert-butyl group.

(b) $D_1$ and $D_2$ each independently is, preferably, a substituted alkyl group, a substituted aryl group, a substituted heterocyclic group, a substituted alkylthio group, or a substituted arylthio group, particularly preferably a substituted aryl group. The substituted aryl group is preferably a phenyl group having at least 2 (preferably 2) sulfo groups or carboxyl groups.

(c) M is preferably an alkali metal ion. Of the alkali metal ions, lithium ion and potassium ion are more preferred.

Additionally, as compounds represented by the general formula (5), those compounds are preferred wherein at least one of the various substituents thereof is a member of the aforesaid preferred groups, those compounds are more preferred wherein more of the various substituents thereof are members of the aforesaid preferred groups, and those compounds are most preferred wherein all substituents thereof are members of the aforesaid preferred groups.

Specific examples of the compounds represented by the general formula (1) will be illustrated below, but the invention is not limited at all by them. Additionally, compound 34 is a reference compound.

[Chem. 11]

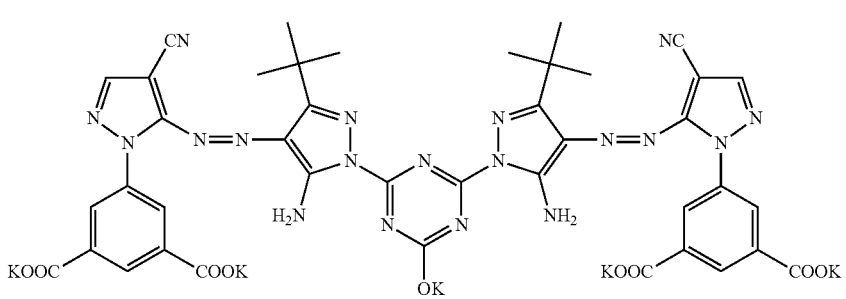

Compound 1

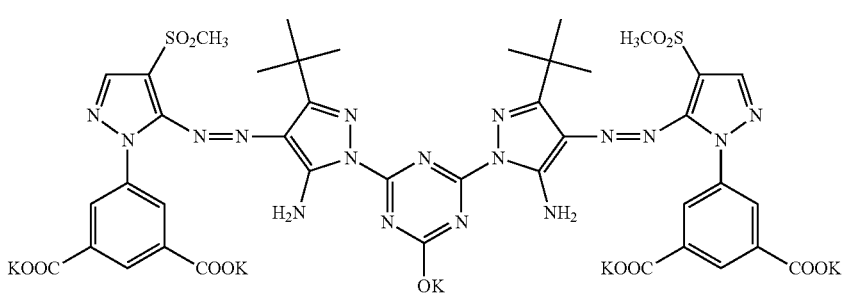

Compound 2

-continued
Compound 3
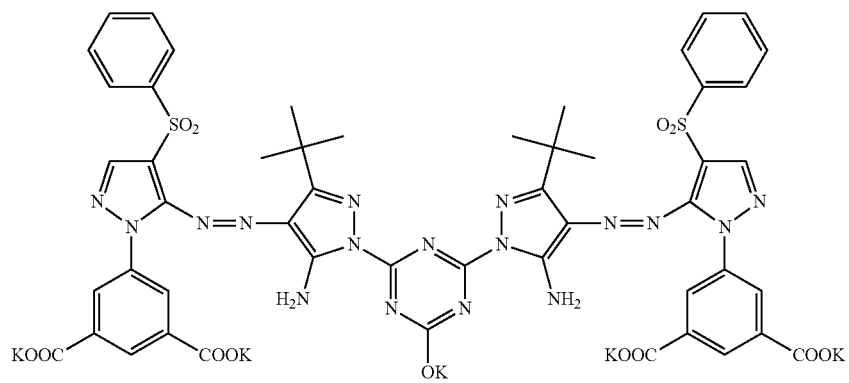
Compound 4
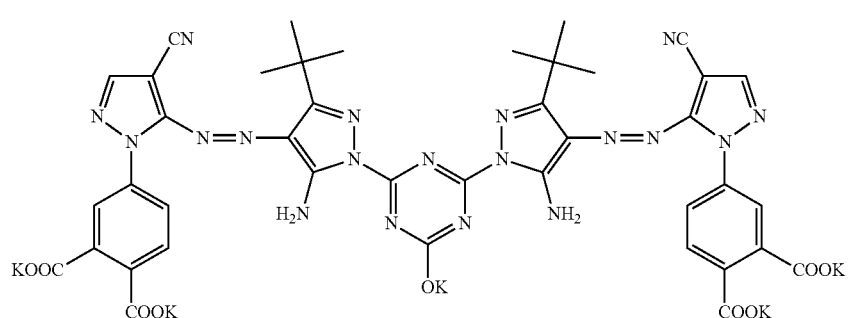
Compound 5
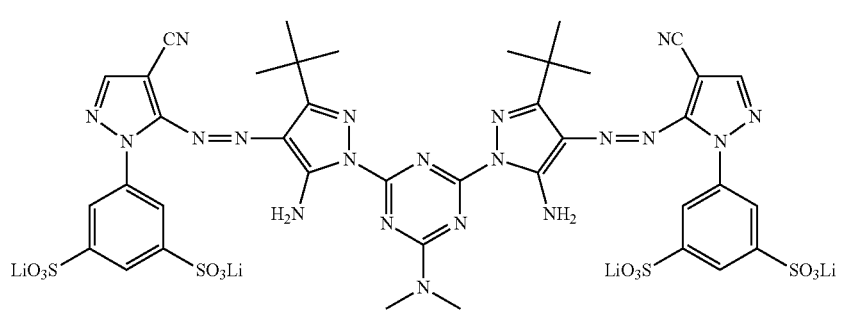
Compound 6
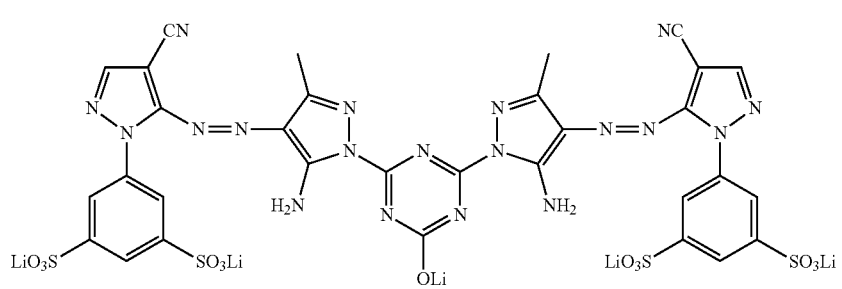
Compound 7
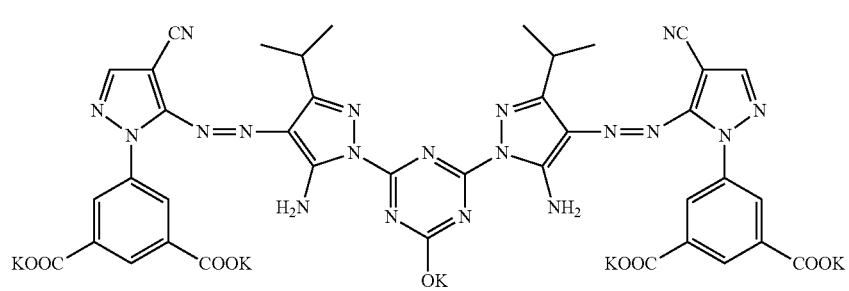

-continued
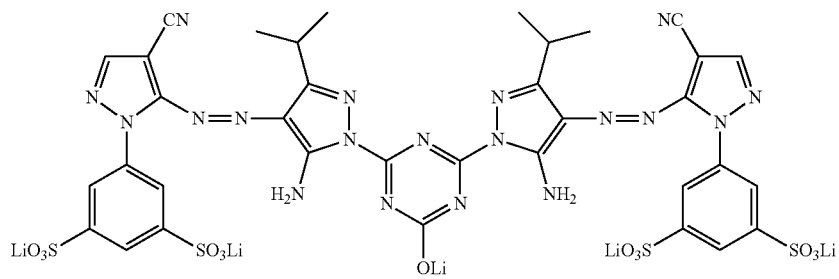
Compound 8
[Chem. 12]
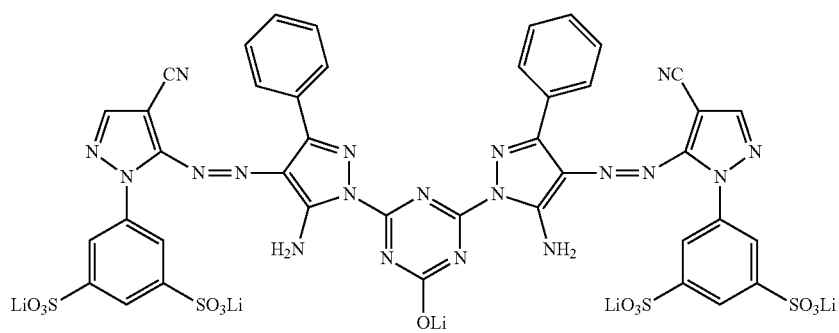
Compound 9
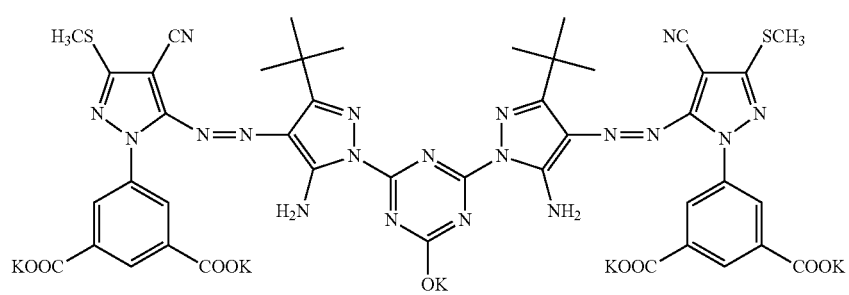
Compound 10
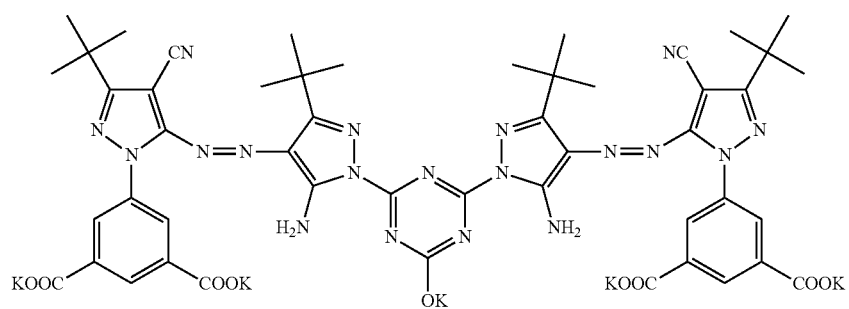
Compound 11
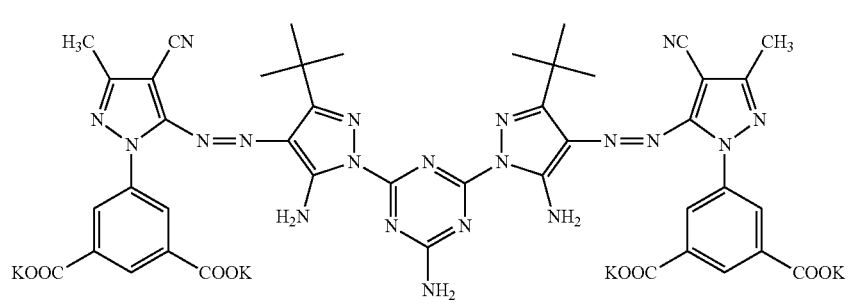
Compound 12

-continued
Compound 13
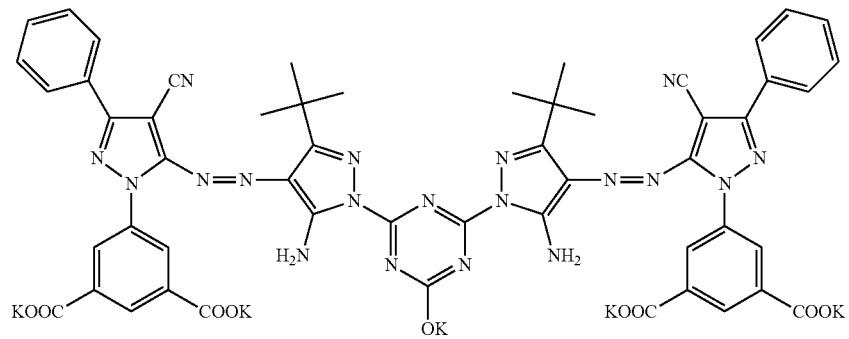
Compound 14
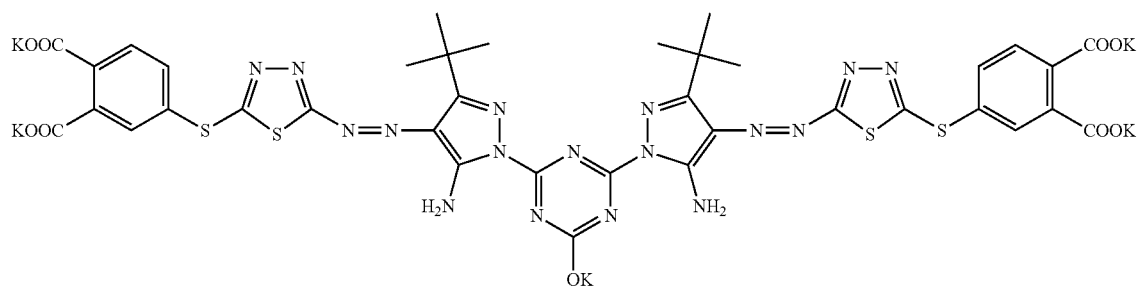
Compound 15
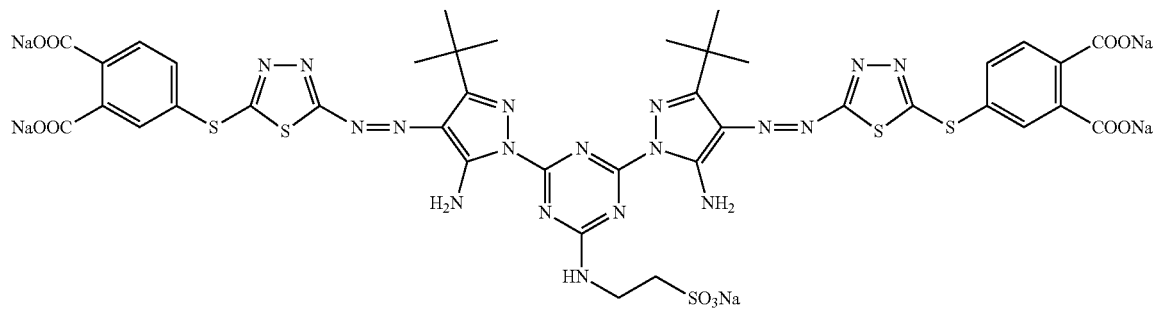
Compound 16
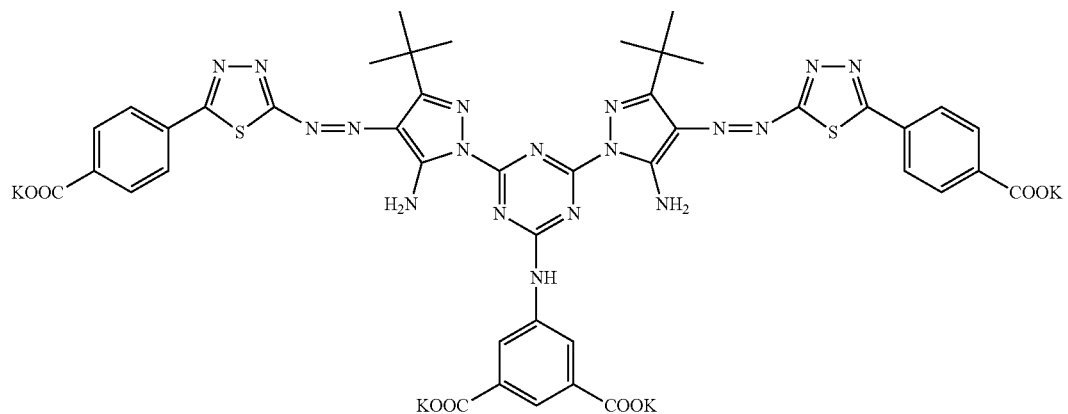

-continued
[Chem. 13]
Compound 17
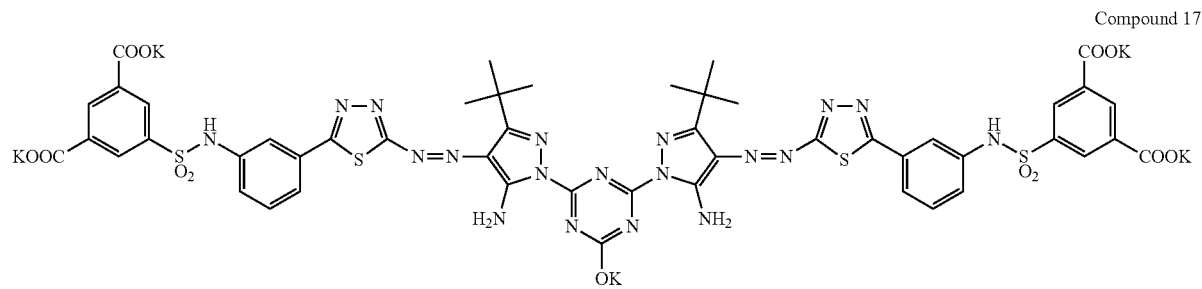
Compound 18
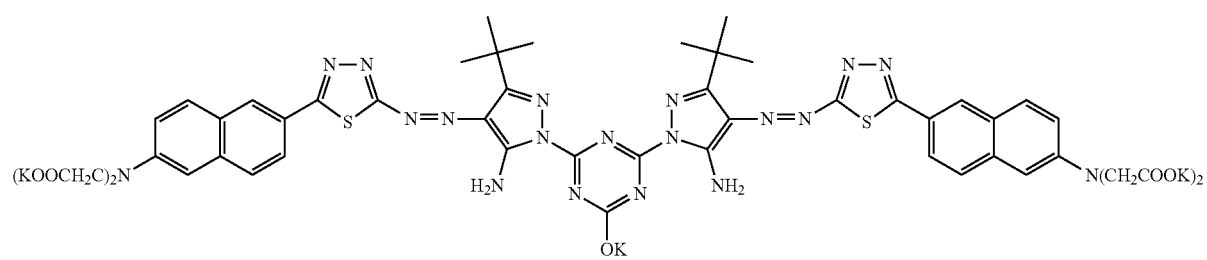
Compound 19
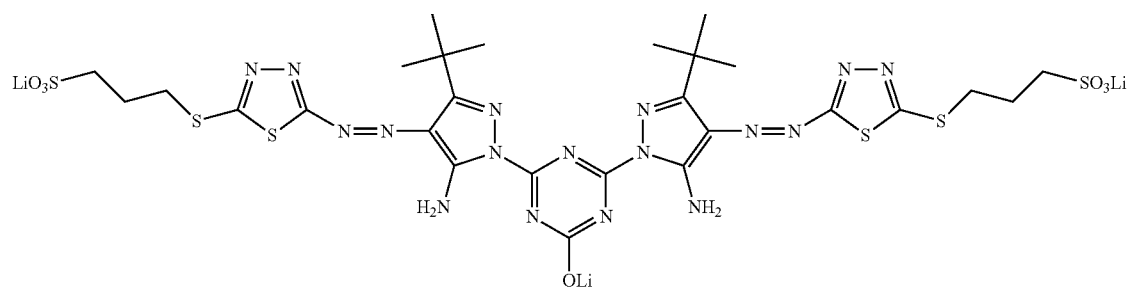
Compound 20
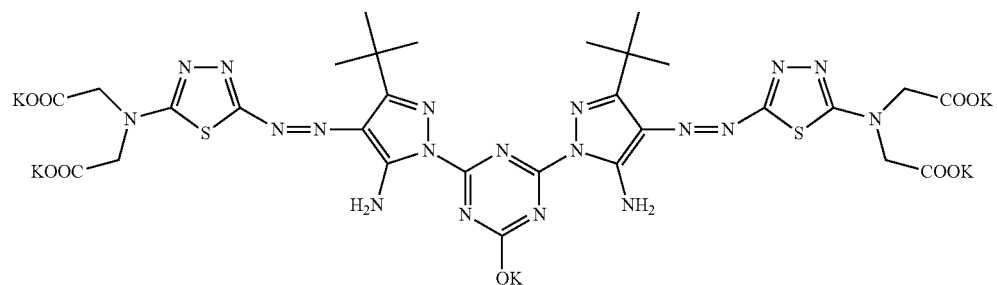
Compound 21
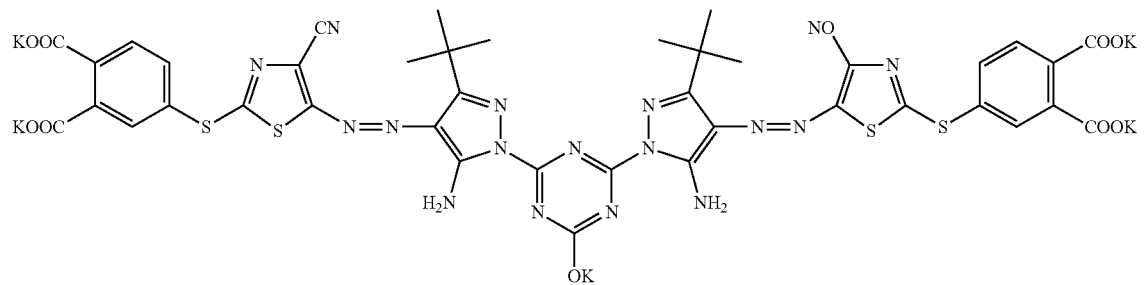

-continued
Compound 22
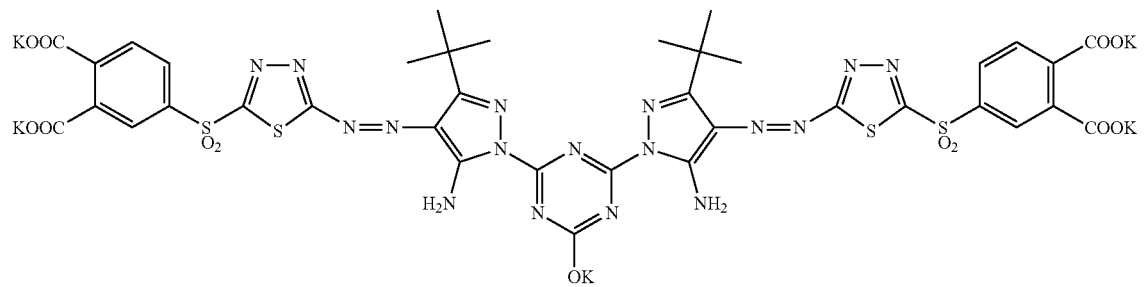
Compound 23
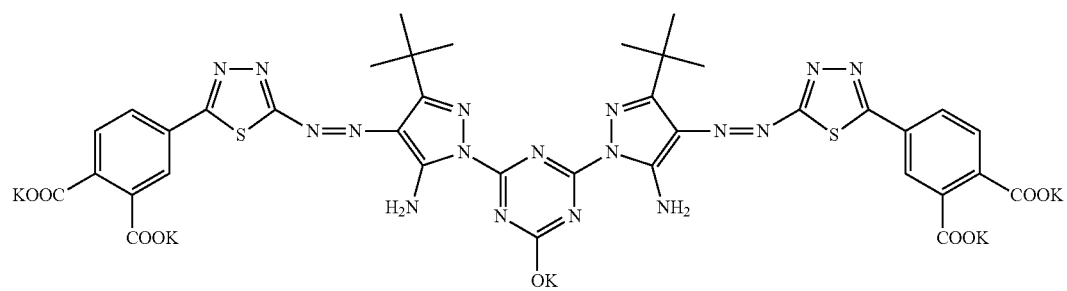
Compound 24
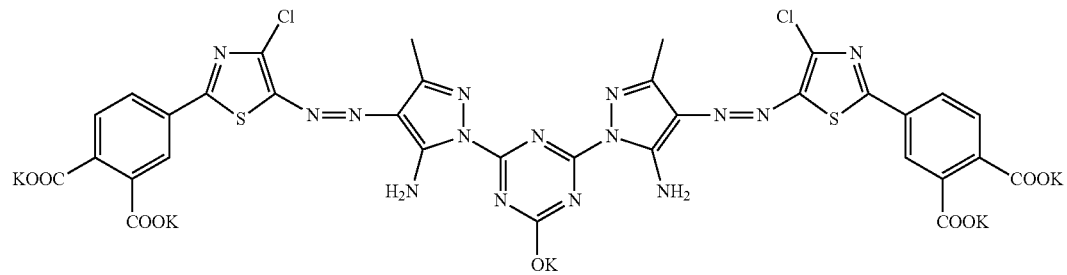
Compound 25
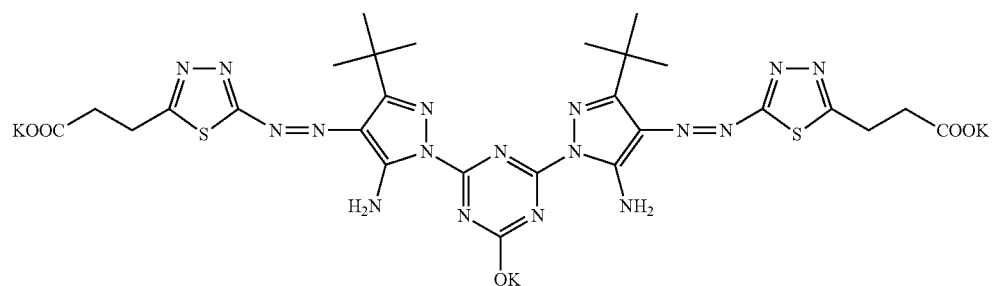
[Chem. 14]
Compound 26
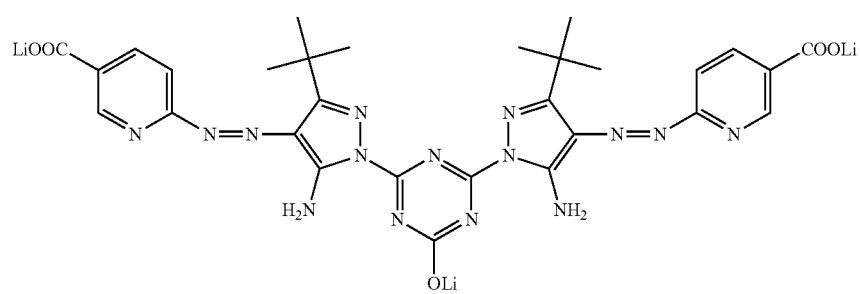

-continued
Compound 27
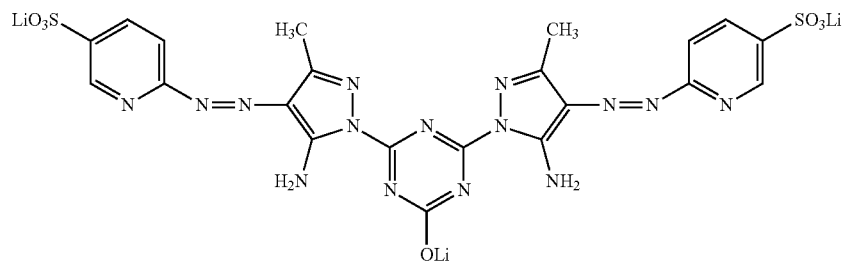
Compound 28
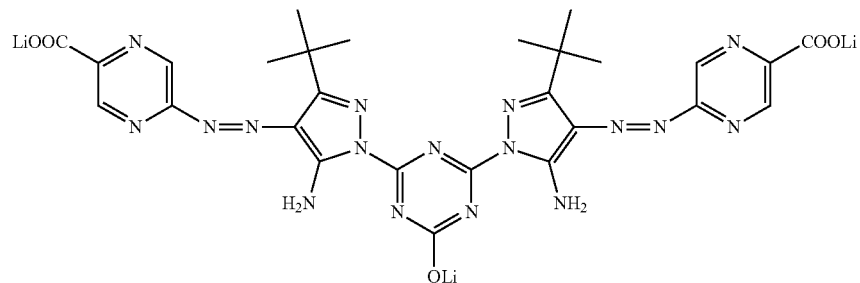
Compound 29
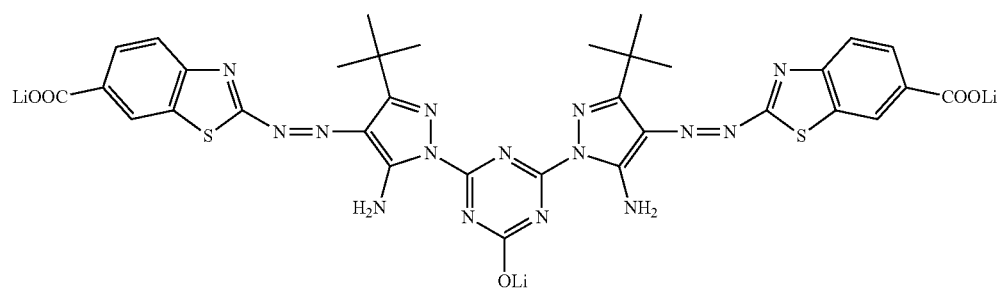
Compound 30
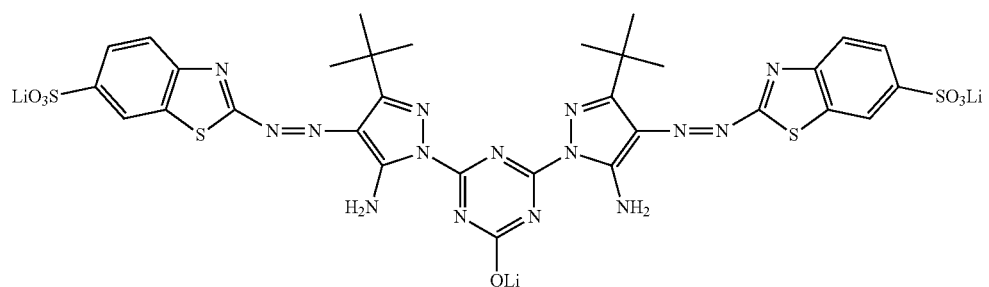
Compound 31
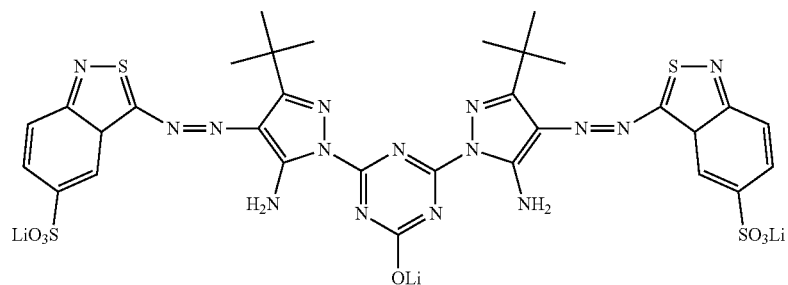

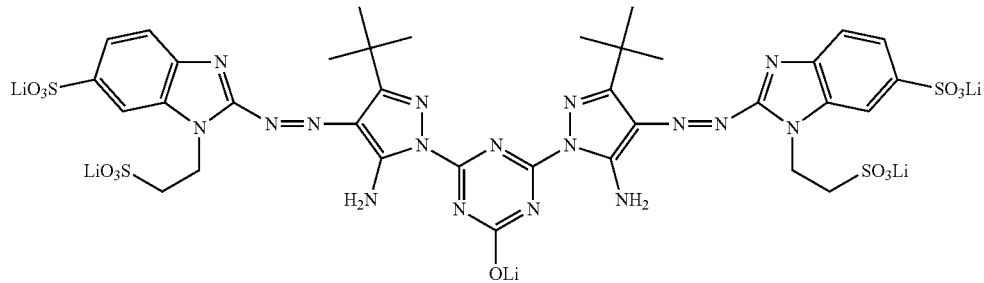

Compound 32

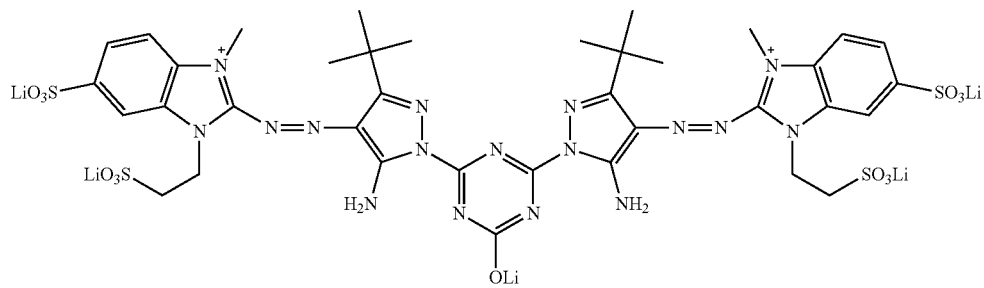

Compound 33

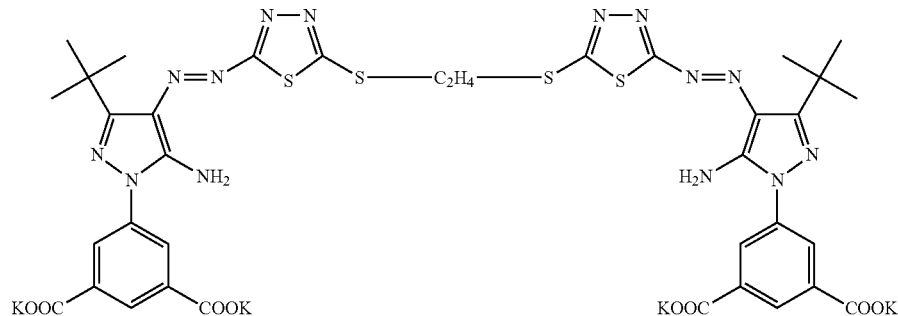

Compound 34

The above-described compounds can be synthesized by the synthesizing processes described in JP-A-2006-57076 and JP-A-2007-217681.

[Ink Composition]

The ink of the invention may contain a medium and, in the case where a solvent is used as the medium, the ink is particularly appropriate as an ink for inkjet recording. The ink of the invention may be prepared by using an oleophilic medium or an aqueous medium as the medium and dissolving and/or dispersing therein a compound of the invention represented by the general formula (1). It is preferred to use an aqueous medium. Additionally, the ink composition of the invention is also briefly referred to merely as "ink". The medium has various functions. It exhibits various effects such as the effect of a humectant for preventing clogging of a jet nozzle for the ink, the effect of a penetration accelerating agent for better penetrating the ink into paper and, in addition, the effects of an ultraviolet absorbent, an antioxidant, a defoaming agent, a viscosity-adjusting agent, a surface tension-adjusting agent, a dispersing agent, a dispersion-stabilizing agent, an antifungal agent, a rust inhibitor, and a pH-adjusting agent. It is possible to adjust physical properties or quality or improve the ink composition by appropriately combining such media.

In the case of dispersing the compound to be used in the invention represented by the general formula (1) in an aqueous medium, it is preferred to disperse colored fine particles containing both a dye and an oil-soluble polymer in an aqueous medium as is described in JP-A-11-286637, JP-A-2001-240763, JP-A-2001-262039, or JP-A-2001-247788 or to disperse the compound of the invention represented by the general formula (1) dissolved in a high-boiling organic solvent as is described in JP-A-2001-262018, JP-A-2001-240763, JP-A-2001-335734, or JP-A-2002-80772. As to the specific method in the case of dispersing the compound to be used in the invention represented by the general formula (1) in an aqueous medium, specific oil-soluble polymers, specific high-boiling organic solvents, specific additives, and amounts thereof to be used, those described in the foregoing patent documents can preferably be employed. Alternatively, the compound of the foregoing general formula (1) may be dispersed as solid in a state of fine particles. Upon dispersing, a dispersant or a surfactant may be used. As the dispersing apparatus, there can be used a simple stirrer, an impeller-stirring system, an in-line stirring system, a mill system (for example, colloid mill, ball mill, sand mill, attritor, roll mill, or agitator mill), a ultrasonic wave system, a high-pressure emulsion dispersion system (high-pressure homogenizer; specific commercially available apparatuses being Gaulin homogenizer, a microfluidizer, and DeBEE2000). As to methods for preparing the above-described ink for inkjet recording, detailed descriptions are also given in JP-A-5-148436, JP-A-5-295312, JP-A-7-97541, JP-A-7-82515, JP-A-7-118584, JP-A-11-286637, and JP-A-2001-271003 in addition to the aforesaid patent documents, and such methods can also be utilized for preparing the ink of the invention for inkjet recording.

The ink composition of the invention is an ink composition which contains a compound represented by the general formula (1) and a humectant, wherein the content of the compound represented by the general formula (1) is from 0.1% by mass to less than 7.0% by mass, the content of the humectant having 3 or more hydroxyl groups is 8.0% by mass or less, and the molar ratio of the humectant having 3 or more hydroxyl groups/the compound represented by the general formula (1) is less than 15.0.

The compound represented by the general formula (1) is used in the ink composition of the invention (preferably an ink composition for inkjet recording) in a content of from 0.1% by mass to less than 7.0% by mass as a solid component per 100 parts by mass of the ink composition, i.e., in a content of from 0.1 to less than 7.0% by mass, preferably from 0.1% by mass to 6.8% by mass, more preferably from 0.5% by mass to 6.7% by mass.

In a preferred embodiment of the invention wherein the compound of the invention represented by the general formula (1) is used in an aqueous medium, the ink composition of the invention is an ink composition comprising an aqueous medium, which contains at least water and a compound represented by the general formula (1), and the content of the compound represented by the general formula (1) is from 0.1% by mass to less than 7.0% by mass, the content of the humectant having 3 or more hydroxyl groups is 8.0% by mass or less, and the molar ratio of the humectant having 3 or more hydroxyl groups/the compound represented by the general formula (1) is less than 15.0. Preferably, the ink composition further contains a humectant having from 0 to 2 hydroxyl groups. The humectant is used for other uses, for example, as an anti-drying agent, a penetration-accelerating agent, and a wetting agent, though not being limited to these uses. For example, triethanolamine exhibits the effect as a humectant and, at the same time, exhibits the effect as a pH-adjusting agent. In this case, the amount of the humectant is restricted in terms of a humectant. The humectants will be described in detail below.

The humectant to be used in the invention is described. The term "humectant" means a component which can be dissolved in an ink composition containing at least a humectant and which functions to reduce evaporation of water. This property can be utilized to suppress drying (condensation) of the ink composition which is one factor of precipitation of a coloring material from the ink composition. The humectant to be used in the invention is preferably a hydrophilic organic solvent which, if it is liquid at 25° C., has a boiling point higher than that of water and which, if it is solid at 25° C., is preferably a compound of a solid humectant soluble in water having a solubility of 0.1% by mass or more, more preferably 0.2% by mass or more, still more preferably 0.5% by mass or more, in water. Here, the hydrophilic organic solvent means an organic solvent which becomes homogenous without liquid separation when mixed with water with a certain ratio. An hydrophilic organic solvent having a solubility (also referred to as "mutual solubility") in water at 25° C. of 5% by mass or more is preferred, an hydrophilic organic solvent having a solubility in water at 25° C. of 10% by mass or more is more preferred, and an hydrophilic organic solvent having a solubility in water at 25° C. of 20% by mass or more is still more preferred. Also, the hydrophilic organic solvent has a boiling point of preferably 100° C. or higher, more preferably 105° C. or higher, still more preferably 110° C. or higher. As the humectant, there are generally illustrated polyhydric alcohol derivatives, glycol ether derivatives, alkylamine derivatives, urea derivatives, derivatives of carboxylic acids and salts thereof, derivatives of amino acids and salts thereof, and sugar derivatives. Preferably, the humectants are polyhydric alcohol derivatives, glycol ether derivatives, alkylamine derivatives, urea derivatives, or derivatives of carboxylic acids and salts thereof. Moreover, polyhydric alcohol derivatives, glycol ether derivatives, alkylamine derivatives, or urea derivatives are more preferred.

Here, the derivative means a compound which is modified with an appropriate substituent by substitution reaction such as alkylation, arylation, heterocyclization, esterification, etherification, halogenations, amidation, hydroxylation, or amination. Of the humectants, compounds having a molecular weight of 1000 or less are preferred, compounds having a molecular weight of 900 or less are more preferred, and humectants having a molecular weight of 800 or less are still more preferred.

Humectants can roughly be grouped in terms of presence or absence of hydroxyl group. Humectants having a hydroxyl group or groups will be described below by reference to specific examples thereof.

As humectants having 3 or more hydroxyl groups, there are illustrated, for example, polyhydric alcohols (e.g., glycerin, erythritol, cyclohexanetriol, butanetriol, trishydroxymethylethane, trimethylolpropane, trimethylolethane, 1,2,6-hexanetriol, heptanetriol, threitol, adonitol, xylitol, sorbitol, mannitol, inositol, and benzenetriol), ether derivatives (e.g., dipentaerythritol), alcoholamines (e.g., triethanolamine, trishydroxymethylaminomethane, tetrakis-hydroxypropylethylenediamine, pentrol, glucosamine, and sodium hyaluronate), and urea derivatives (e.g., tetrahydroxyethylurea). More preferred are glycerin, erythritol, cyclohexanetriol, trishydroxymethylethane, trimethylolpropane, sorbitol, inositol, benzenetriol, dipentaerythritol, triethanolamine, trishydroxymethylaminomethane, pentrol, and glucosamine, and still more preferred are glycerin, trimethylolpropane, triethanolamine, and trishydroxymethylaminemethane.

The content of the humectant having 3 or more hydroxyl groups in the ink composition is preferably 8.0% by mass or less, more preferably 5.0% by mass or less, still more preferably 2.0% by mass or less, particularly preferably 1.0% by mass or less. More preferably, the content of the humectant having 3 or more hydroxyl groups in the ink composition is preferably from 0.01% by mass to 8.0% by mass, more preferably from 0.01% by mass to 5.0% by mass, still more preferably from 0.01% by mass to 2.0% by mass or less, particularly preferably from 0.01% by mass to 1.0% by mass.

As a humectant having 1 or 2 hydroxyl groups, there are illustrated polyhydric alcohols represented by ethylene glycol, propylene glycol, diethylene glycol, triethylene glycol, tetraethylene glycol, polyethylene glycol, thiodiethylene glycol, dithiodiglycol, 2-methyl-1,3-propanediol, etc.; lower alkyl ethers of polyhydric alcohols such as ethylene glycol monomethyl(or ethyl) ether, diethylene glycol monomethyl (or ethyl) ether, triethylene glycol monoethyl(or butyl) ether, etc.; amines such as ethanol amine, diethanolamine, N-methyldiethanolamine, N-ethyldiethanolamine, serine, homoserine, etc.; and heterocyclic compounds such as 2-hydroxyethyl-2-pyrrolidone. More preferred are propylene glycol, diethylene glycol, triethylene glycol, tetraethylene glycol, 2-methyl-1,3-propanediol, ethylene glycol monoethyl ether, diethylene glycol monoethyl ether, triethylene glycol monobutyl ether, ethanolamine, diethanolamine, N-methyldiethanolamine, and 2-hydroxyethyl-2-pyrrolidone, and still more preferred are diethylene glycol, triethylene glycol, tetraethylene glycol, diethylene glycol monoethyl ether, triethylene glycol monobutyl ether, ethanolamine, diethanolamine, N-methyldiethanolamine, and 2-hydroxyethyl-2-pyrrolidone.

The content of the humectants having 1 or 2 hydroxyl groups in the ink composition of the invention is preferably from 0.5% by mass to 40% by mass, more preferably from 5% by mass to 30% by mass.

Also, the ink composition of the invention is preferably an ink composition containing the aforesaid humectant having from 0 to 2 hydroxyl groups, more preferably an ink composition containing the humectants having 0 or 1 hydroxyl group.

As humectants having no hydroxyl group, there are illustrated, for example, diethylene glycol dimethyl ether, tetraethylene glycol dimethyl ether, amines (e.g., morpholine, N-ethylmorpholine, ethylenediamine, diethylenetriamine, triethylenetetramine, and polyethyleneimine, tetramethylpropylenediamine), polar solvents (e.g., formamide, N,N-dimethylformamide, N,N-diethylacetamide, dimethylsulfoxide, sulfolane, 3-sulfolene, 2-pyrrolidone, N-methyl-2-pyrrolidone, N-vinyl-2-pyrrolidone, 2-oxazolidone, and 1,3-dimethyl-2-imidazolidinone), urea derivatives (urea, ethylene urea, and thiourea), and carboxylic acid derivatives (pyridonecarboxylic acid, lactic acid, citric acid, and salts of these). Preferred are tetraethylene glycol dimethyl ether, morpholine, sulfolane, 2-pyrrolidone, urea, and ethylene urea, and still more preferred are 2-pyrrolidone, urea, and ethylene urea. The content of the humectant having no hydroxyl group in the ink composition is preferably from 0.5% by mass to 30% by mass, more preferably from 0.5% by mass to 20% by mass.

A preferred embodiment of the invention is an ink composition which contains a compound represented by the general formula (1) and a humectant having 3 or more hydroxyl groups, and the molar ratio of the humectant having 3 or more hydroxyl groups/the compound represented by the general formula (1) is less than 15.0, preferably less than 5.0, more preferably from 0.01 to less than 5.0, still more preferably from 0.01 to less than 2.0, especially preferably from 0.01 to less than 0.40.

In particular, a more preferred embodiment of the invention is an ink composition which satisfies the above-described requirements and which, in addition to this, contains the humectant having 3 or more hydroxyl groups in a content of less than 18.0% by mass, preferably less than 10.0% by mass, more preferably from 0.01% by mass to less than 10.0% by mass, still more preferably from 0.01% by mass to less than 4.0% by mass, especially from 0.01% by mass to less than 1.0% by mass, based on all the humectants in the ink composition.

Media which can be added to the ink composition and impart an effect different from the humectant effect will be described below.

As a penetration accelerating agent to be used in the invention, there can be used alcohols such as ethanol, isopropanol, butanol, di(tri)ethylene glycol monobutyl ether, and 1,2-hexanediol; sodium laurylsulfate; sodium oleate; nonionic surfactants; etc.

In the invention, glycol ether series penetration accelerating agents such as diethylene glycol monobutyl ether and triethylene glycol monobutyl ether are preferably used. These are preferably used in an amount of not causing blurring of printed products and not causing print-through.

However, in the case where the compound to be used as a penetration in the invention also functions as a humectant, the addition amount of the compound is calculated as a humectant, thus the aforesaid restriction on addition amount being applied.

As an ultraviolet ray absorbent to be used in the invention for improving storage stability, there may be used benzotriazole series compounds described in JP-A-58-185677, JP-A-61-190537, JP-A-2-782, JP-A-5-197075, JP-A-9-34057, etc., benzophenone series compounds described in JP-A-46-2784, JP-A-5-194483, U.S. Pat. No. 3,214,463, etc., cinnamic acid series compounds described in JP-B-48-30492, JP-B-56-21141, JP-A-10-88106, etc., triazine series compounds described in JP-A-4-298503, JP-A-8-53427, JP-A-239368, JP-A-10-182621, JP-T-8-501291 (the term "JP-T" as used herein means a published Japanese translation of a PCT patent application), etc., compounds described in Research Disclosure No. 24239, and so-called fluorescent brightening agents which are compounds, as typified by stilbene and benzoxazole compounds, capable of absorbing ultraviolet rays to emit fluorescence. These are preferably used in an amount of less than 5% by mass. However, in the case where the compound to be used as an ultraviolet ray absorbent in the invention also functions as a humectant, the addition amount of the compound is calculated as a humectant, thus the aforesaid restriction on addition amount being applied.

In the invention, as the antioxidant to be used for improving storage stability of an image, various organic and metal complex series anti-fading agents may be used. As the organic anti-fading agents, there are illustrated hydroquinones, alkoxyphenols, dialkoxyphenols, phenols, anilines, amines, indanes, chromans, alkoxyanilines, and heterocyclic compounds and, as the metal complexes, there are illustrated nickel complexes and zinc complexes. More specifically, compounds described in the patents cited in *Research Disclosure* No. 17643, VII, items I to J, ibid., Nos. 15162 and 18716, left column, P. 650 ibid., No. 36544, p. 527, ibid., No. 307105, p. 872, ibid., No. 15162, and compounds included in the general formula of representative compounds and compound examples described in JP-A-62-215272, pp. 127-137 may be used. These are used in a content of up to less than 5% by mass. In the invention, however, in the case where the compound to be used as an antioxidant also functions as a humectant, the addition amount of the compound is calculated as a humectant, thus the aforesaid restriction on addition amount being applied.

The defoaming agent to be used in the invention is a copolymer between dimethylpolysiloxane and polyalkylene oxide, including pendant type, end modification type, and ABN type. As these polymers, there are illustrated FZ-2203, -2207, -2222, and -2166 (trade names; manufactured by Nippon Unicar Company Limited). These are preferably used in a content of less than 5% by mass. In the invention, however, in the case where the compound to be used as an antifoaming agent also functions as a humectant, the addition amount of the compound is calculated as a humectant, thus the aforesaid restriction on addition amount being applied.

As the antifungal agent to be used in the invention, there are illustrated sodium dehydroacetate, sodium benzoate, sodium pyridinethione-1-oxide, ethyl p-hydroxybenzoate, 1,2-benzisothiazoline-3-one, and salts thereof. The content of these antifungal agents in the ink is preferably from 0.02 to 5.00% by mass.

Additionally, detailed descriptions on these compounds are given in "*Bokin Bokabizai Jiten*" (Dictionary of Antibacterial and Antifungal Agents) compiled by Nippon Bokin Bobai Kakkai Jiten Henshuu Iinkai.

Also, as the rust inhibitor, there are illustrated, for example, acid sulfite, sodium thiosulfate, ammonium thioglycolate, diisopropylammonium nitrite, pentaerythritol tetranitrate, dicyclohexyl ammonium nitrite, and benzotriazole. These are preferably used in the ink in a content of from 0.02 to 5.00% by mass.

The pH-adjusting agent to be used in the invention may preferably be used in the point of adjustment of pH and imparting dispersion stability. It is preferred to adjust the pH of the ink at 23° C. to from 8 to 11, preferably from 7 to 9. In the case where the pH is less than 8, solubility of the compound of the general formula (1) is decreased to cause clogging of nozzles whereas, in the case where the pH exceeds 11, water resistance tends to be reduced. As the pH-adjusting agents, there are illustrated organic bases and inorganic alkalis as basic agents, and organic acids and inorganic acids as acidic agents.

As the aforesaid organic bases, there are illustrated triethanolamine, diethanolamine, N-methyldiethanolamine, and dimethylethanolamine. More preferred are diethanol amine, N-methyldiethanolamine, and dimethylethanolamine, and still more preferred are N-methyldiethanolamine and dimethylethanolamine. As the aforesaid inorganic alkalis, there are illustrated alkali metal hydroxides (e.g., sodium hydroxide, lithium hydroxide, and potassium hydroxide), carbonates (e.g., sodium carbonate and sodium hydrogencarbonate), and ammonium. Also, as the aforesaid organic acids, there are illustrated acetic acid, propionic acid, trifluoroacetic acid, and alkylsulfonic acid.

As the aforesaid inorganic acid, there are illustrated hydrochloric acid, sulfuric acid, and phosphoric acid. In the invention, however, in the case where the compound to be used as an pH-adjusting agent also functions as a humectant, the addition amount of the compound is calculated as a humectant, thus the aforesaid restriction on addition amount being applied. Additionally, triethanolamine functions also as a humectant having 3 or more hydroxyl groups, thus the aforesaid restriction on addition amount being applied.

As the surface tension-adjusting agent or the like in the invention, there are illustrated nonionic, cationic, or anionic surfactants. As the anionic surfactants, there are illustrated, for example, fatty acid salts, alkylsulfonates, alkylbenzenesulfonates, alkylnaphthalenesulfonates, dialkylsulfosuccinates, alkylphosphates, naphthalenesulfonic acid formaline condensates, and polyoxyethylene alkylsulfonates, and as the nonionic surfactants, there are illustrated polyoxyethylene alkyl ethers, polyoxyethylene alkylaryl ethers, polyoxyethylene fatty acid esters, sorbitan fatty acid esters, polyoxyethylene sorbitane fatty acid esters, polyoxyethylene alkylamines, glycerin fatty acid esters, and oxyethylene-oxypropylene block copolymers. These are preferably used in a content of less than 5% by mass. In the invention, however, in the case where the compound to be used as a surface tension-adjusting agent also functions as a humectant, the addition amount of the compound is calculated as a humectant, thus the aforesaid restriction on addition amount being applied.

In the invention, acetyleneglycol series surfactants (preferably, acetylene series polyoxyethylene oxide) are preferably used and, as examples thereof, there are illustrated SURFYNOLS (manufactured by Air Products & Chemicals; e.g., SURFYNOL 465, ec.). The content of the surfactant is from 0.001 to 15% by mass, preferably from 0.005 to 10% by mass, still more preferably from 0.01 to 5% by mass, particularly preferably from 0.1 to 5% by mass.

The surface tension of the ink to be used in the invention is preferably from 20 to 50 mN/m, more preferably from 20 to 40 mN/m, at 25° C. in terms of both dynamic surface tension and static surface tension. In case when surface tension exceeds 50 mN/m, there result reduction of ejection stability, blurring upon color mixing, and serious reduction of printing quality such as bleeding. Also, in case when surface tension of the ink is made less than 20 mN/m, there results, in some cases, printing failure due to, for example, adhesion of the ink onto the surface of a hardware.

The viscosity of the ink of the invention is preferably from 1 to 30 mPa·s, more preferably from 2 to 15 mPa·s, particularly from 2 to 10 mPa·s, at 25° C. In case when the viscosity exceeds 30 mPa·s, there results a reduced fixing speed of a recorded image and reduced ejection performance. In case when the viscosity is less than 1 mPa·s, there results reduced quality due to blurring of a recorded image.

The viscosity can arbitrarily be adjusted through addition amount of an ink solvent. Examples of the ink solvent include glycerin, diethylene glycol, propylene glycol, triethanolamine, 2-pyrrolidone, diethylene glycol monobutyl ether, and triethylene glycol monobutyl ether. Diethylene glycol, propylene glycol, 2-pyrrolidone, diethylene glycol monobutyl ether, and triethylene glycol monobutyl ether are more preferred, and diethylene glycol, 2-pyrrolidone, and triethylene glycol monobutyl ether are still more preferred. Glycerin functions also as a humectant having 3 or more hydroxyl groups, the aforesaid restriction on addition amount is applied.

Also, a iscosity-adjusting agent may be used. As the viscosity-adjusting agent, there may be illustrated, for example, celluloses, water-soluble polymers such as polyvinyl alcohol, and nonionic surfactants. More detailed descriptions are given in "*Nendo Chosei Gijutsu*" (Viscosity Adjusting Technology) (Gijutsu Joho Kyokai, 1999), chapter 9, and "Inkjet Purinta-Yo Kemikaruzu" (Chemicals for inkjet printers), (enlarged in 1998)—Zairyo no Kaihatsudoko•tenbo Chosa—(CMC, 1997), pp. 162-174. These are preferably used in a content of less than 5% by mass. In the invention, however, in the case where the compound to be used as aviscosity-adjusting agent also functions as a humectant, the addition amount of the compound is calculated as a humectant, thus the aforesaid restriction on addition amount being applied.

The ink of the invention is preferably used as a yellow ink. It may be used not only for forming a yellow single color image but also for forming a full-color image. In order to form a full-color image, a magenta ink and a cyan ink may be used in addition to the yellow ink. Also, in order to adjust color tone, a black ink may also be used. The ink of the invention may also be used for adjusting color tone of the black ink or the like.

As magenta inks which can be used within the range of providing the advantages of the recording method of the invention, there may be illustrated aryl or heteryl azo dyes having, for example, phenols, naphthols, or anilines as coupler components; azomethine dyes having, for example, pyrazolones or pyrazolotriazoles as coupler components; methine dyes such as arylidene dyes, styryl dyes, merocyanine dyes, cyanine dyes, and oxonol dyes; carbonium dyes such as diphenylmethane dyes, triphenylmethane dyes, and xanthene dyes; quinone dyes such as naphthoquinone dyes, anthraquinone dyes, and anthrapyridone dyes; and condensation polycyclic dyes such as dioxazine dyes.

As cyan inks which can be used within the range of providing the advantages of the recording method of the invention, there may be illustrated aryl or heteryl azo dyes having, for example, phenols, naphthols, or anilines as coupler components; azomethine dyes having, for example, phenols, naphthols, hetrocyclic moieties such as pyrrolotriazoles; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; and indigo-thioindigo dyes.

As the applicable black color materials, there may be illustrated a carbon black dispersion as well as disazo, trisazo, and tetrazo dyes.

The ink set of the invention is an ink set to be used for an inkjet recording method and contains the aforesaid ink composition of the invention as a constituent. It comprises an ink cartridge containing the yellow ink composition of the invention and ink compositions of other colors than yellow color such as a magenta ink composition, a cyan ink composition, a black ink composition, and the like, integrally or independently, and the ink cartridge may be formed by properly employing conventionally known methods except for containing the aforesaid yellow ink composition of the invention.

[Inkjet Recording Method]

Next, the recording method of the invention using the above-described ink composition will be described below. The ink of the invention is recorded on a recording medium. In a preferred inkjet recording method of the invention, energy is supplied to the aforesaid ink for inkjet recording and thus an image is formed on a publicly known image-receiving material, i.e., plain paper, resin-coated paper, inkjet papers (for example, those described in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597, JP-A-10-337947, etc.), films, electrophotographic papers, fabrics, glasses, metals, ceramics, or the like. Additionally, the description in JP-A-2003-306623, paragraphs [0093] to [0105] is applicable to the inkjet recording method of the invention.

In the image forming step, it is also possible to use a polymer latex compound in order to impart gloss and water resistance or improve weatherability. The latex compound may be added to the image-receiving material either before, after or simultaneously with the addition of the coloring agent. Thus, it may be added either to the image-receiving paper or the ink. Alternatively, the polymer latex may be used independently as a liquid.

Specifically, methods described in JP-A-2002-166638, JP-A-2002-121440, JP-A-2002-154201, JP-A-2002-144696, JP-A-2002-080759, JP-A-2002-187342, and JP-A-2002-172774 may preferably be used.

A recording medium (recording paper and recording film) to be used when conducting inkjet printing using the ink of the invention will be described below. The supports of a recording paper and a recording film comprise chemical pulp, e.g., LBKP and NBKP, mechanical pulp, e.g., GP, PGW, RMP, TMP, CTMP, CMP, and CGP, and waste paper pulp, e.g., DIP. Additives, e.g., conventionally known pigments, a binder, a sizing agent, a fixing agent, a cationic agent, and a paper strength reinforcing agent, are mixed with pulps according to necessity. Supports manufactured by various apparatus, e.g., Fourdrinier machine and Yankee machine, may be used in the present invention. Besides these supports, synthetic paper and plastic film sheets may be used as supports. The thickness of a support is preferably from 10 to 250 μm, and weighting is preferably from 10 to 250 g/m². The support may be directly provided with an ink-receiving layer and a back coat layer, or an ink-receiving layer and a back coat layer may be provided after conducting size pressing or providing an anchor coat layer using starch, polyvinyl alcohol, or the like. A support may be subjected to smoothing treatment by a calendar, e.g., a machine calendar, a TG calendar, or a soft calendar. In the invention, paper and plastic films both surfaces of which are laminated with polyolefin (e.g., polyethylene, polystyrene, polybutene, or copolymer of them) are more preferably used as supports. It is preferred to add a white pigment (e.g., titanium oxide and zinc oxide) or a tinting dye (e.g., cobalt blue, ultramarine, or neodymium oxide) into polyolefin.

The ink-receiving layer provided on a support contains a pigment and an aqueous binder. As the pigment, a white pigment is preferred. As the white pigment, there are illustrated, for example, inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate, and organic pigments such as styrene series pigments, acrylic series pigments, urea resins, and melamine resins. Porous inorganic pigments are preferred as the white pigment to be contained in the ink-receiving layer, and synthetic amorphous silica having a great pore area is particularly preferred. As the synthetic amorphous silica, both silicic anhydride manufactured by a dry production method and silicic hydrate manufactured by a wet method may be used, and silicic hydrate is particularly preferably used.

The inkjet recording method of the invention is not particularly limited as to the inkjet recording system, and may be applied to known systems such as a electric charge-controlling system wherein an ink is ejected by utilizing electrostatic attractive force, a drop-on-demand system (pressure pulse system) utilizing oscillation pressure of a piezo element and using an inkjet head which forms an ink droplet based on mechanical deformation of an electrostriction element, an acoustic inkjet system of converting an electron signal to an acoustic beam and irradiating an ink with the beam to thereby eject the ink utilizing a radiation pressure, and a thermal inkjet system of heating an ink to form bubbles and utilizing the generated pressure. The inkjet recording system includes a system wherein a low concentration ink called photo ink is ejected in a form of many droplets with a small volume, and a system wherein a plurality of inks having substantially the same color hue and being different from each other in concentration are used to improve image quality. The inkjet recording method of the invention is preferably conducted by ejecting liquid droplets of the ink composition and depositing the liquid droplets onto a recording medium. The recording method of the invention can particularly preferably be applied to the inkjet recording system but, needless to say, it can be used for other applications such as pens, recorders, and pen plotters. Also, the recorded product of the invention is a product obtained by printing according to the inkjet recording method.

EXAMPLES

The present invention will be described by reference to Examples, but the invention is not limited only to them.

Ultrapure water (electric resistance value: 18 MΩ or more) is added to the following components to make 1 liter, followed by stirring for 1 hour at 30 to 40° C. under stirring. Subsequently, the resulting mixture is filtered under reduced pressure through a microfilter of 0.25 μm in average pore size to obtain an ink liquid. The ultrapure water is added into this ink to make 1000 g of ink 1. In this ink 1, the molar ratio of the humectant having 3 or more hydroxyl groups/the compound represented by the foregoing general formula (1) is 0.31, and the content of the humectant having 3 or more hydroxyl groups based on all humectants is 0.70% by mass.

[Formulation of Ink 1]

| | |
|---|---|
| Compound 1 | 65 g/l |
| Urea | 10 g/l |
| Triethylene glycol | 90 g/l |
| Glycerin | 1.2 g/l |
| Triethylene glycol monobutyl ether | 90 g/l |
| 2-Pyrrolidone | 50 g/l |
| Triethanolamine | 0.5 g/l |
| Surfynol 465 (manufactured by Nissin Chemical Industry Co., Ltd.) | 10 g/l |
| Proxel XL2 (manufactured by Fuji-Film Imaging Colorants) | 5 g/l |

[Preparation of Inks 2 to 39]

Inks 2 to 66 are prepared according to the formulation of ink 1 except for changing the compounds, additives, and the amounts thereof as shown in Tables 1 to 3. In the tables, the term "molar ratio" as used herein means a molar ratio of the humectant having 3 or more hydroxyl groups/the compound represented by the foregoing general formula (1). For example, in ink 3, the humectants having 3 or more hydroxyl groups are glycerin and triethanolamine.

TABLE 1

| | g/l | | | | | | | | |
|---|---|---|---|---|---|---|---|---|---|
| | Ink 2 | Ink 3 | Ink 4 | Ink 5 | Ink 6 | Ink 7 | Ink 8 | Ink 9 | Ink 10 |
| Compound 1 | 60 | | | | | | 50 | | |
| Compound 4 | | 68 | | | | | | 50 | |
| Compound 7 | | | 68 | | | | | | |
| Compound 17 | | | | 69 | | | | | 50 |
| Compound 21 | | | | | 65 | | | | |
| Compound 25 | | | | | | 65 | | | |
| Glycerin | 1.2 | 1 | 1 | 1 | 1.5 | 1.5 | 0 | 1 | 1 |
| Tetraethylene glycol | | | | | | 90 | | 40 | |
| Triethylene glycol | 90 | 90 | 40 | 90 | 90 | | 40 | 40 | 90 |
| Prolypene glycol | 90 | 100 | 100 | 100 | | | 40 | | 90 |
| Diethylene glycol | | | | | | 15 | | | |
| 1,2-Hexanediol | | | | | 10 | | | | |
| TEGmBE (*1) | 90 | 100 | 90 | 90 | 90 | 50 | 90 | 90 | 90 |
| DEGmBE (*1) | | | | | | | 90 | 90 | |
| Olfine E1010 (*2) | | | | | | | 10 | 10 | |
| Olfine PD001 (*2) | | | | | 10 | 10 | | | |
| Surfynol 465 (*2) | 10 | 10 | 10 | 10 | 10 | 10 | 10 | 10 | 10 |
| 2-Pyrrolidone | 50 | 50 | 50 | 50 | 50 | 50 | 50 | 50 | 50 |
| Urea | 20 | 25 | 10 | 10 | 25 | 25 | 20 | 25 | 10 |
| Triethanolamine | | 0.5 | 0.5 | | | | | | |
| Diethanolamine | 6 | 6.5 | 6.5 | 7 | 7 | 7 | 5 | 5 | 5 |
| Proxel XL2 (*3) | 5 | 5 | 5 | 5 | 5 | 5 | 5 | 5 | 5 |
| % By mass of humectant having 3 or more hydroxyl groups based on the whole amount of ink | 0.1 | 0.2 | 0.2 | 0.1 | 0.2 | 0.2 | 0.0 | 0.1 | 0.1 |
| Molar ratio | 0.25 | 0.24 | 0.24 | 0.22 | 0.31 | 0.21 | 0.00 | 0.25 | 0.31 |
| % By mass of humectant having 3 or more hydroxyl groups based on all the humectants | 0.35 | 0.40 | 0.50 | 0.29 | 0.55 | 0.63 | 0.00 | 0.29 | 0.30 |

| | g/l | | | | | | | | |
|---|---|---|---|---|---|---|---|---|---|
| | Ink 11 | Ink 12 | Ink 13 | Ink 14 | Ink 15 | Ink 16 | Ink 17 | Ink 18 | Ink 19 |
| Compound 1 | 40 | | 20 | | 5 | | | | |
| Compound 4 | | | | | | | | | |
| Compound 7 | | | | | | | | | |
| Compound 17 | | 40 | | 20 | | 5 | 65 | 65 | 65 |
| Compound 21 | | | | | | | | | |
| Compound 25 | | | | | | | | | |
| Glycerin | 1 | 0 | 0.3 | 0.3 | 0 | 0 | 5 | 10 | 20 |
| Tetraethylene glycol | 90 | 40 | | | | | 90 | 90 | 90 |
| Triethylene glycol | | 40 | 40 | 40 | 40 | 40 | 90 | 90 | 90 |
| Prolypene glycol | | 40 | 40 | 40 | 40 | 40 | | | |
| Diethylene glycol | | | | | | | | | |
| 1,2-Hexanediol | | | | | | | | | |
| TEGmBE (*1) | 40 | 90 | 90 | 90 | 90 | 90 | 90 | 90 | 90 |
| DEGmBE (*1) | 40 | 90 | 90 | 90 | 90 | 90 | | | |

TABLE 1-continued

| | | | | | | | | | |
|---|---|---|---|---|---|---|---|---|---|
| Olfine E1010 (*2) | 10 | 10 | 10 | 10 | 10 | 10 | | | |
| Olfine PD001 (*2) | | | | | | | | | |
| Surfynol 465 (*2) | 10 | 10 | 10 | 10 | 10 | 10 | 10 | 10 | 10 |
| 2-Pyrrolidone | 50 | 50 | 50 | 50 | 50 | 50 | 90 | 90 | 90 |
| Urea | 20 | 20 | 20 | 20 | 20 | 20 | 5 | 5 | 5 |
| Triethanolamine | | | | | 0.1 | 0.1 | | | |
| Diethanolamine | 4 | 4 | 2 | 2 | 1 | 1 | 1 | 1 | 1 |
| Proxel XL2 (*3) | 5 | 5 | 5 | 5 | 5 | 5 | 5 | 5 | 5 |
| % By mass of humectant having 3 or more hydroxyl groups based on the whole amount of ink | 0.1 | 0.0 | 0.0 | 0.0 | 0.0 | 0.0 | 0.5 | 1.0 | 2.0 |
| Molar ratio | 0.31 | 0.00 | 0.18 | 0.23 | 0.17 | 0.21 | 1.19 | 2.38 | 4.76 |
| % By mass of humectant having 3 or more hydroxyl groups based on all the humectants | 0.41 | 0.00 | 0.09 | 0.09 | 0.03 | 0.03 | 1.35 | 2.66 | 5.18 |

| | g/l | | | | | | |
|---|---|---|---|---|---|---|---|
| | Ink 20 | Ink 21 | Ink 22 | Ink 23 | Ink 24 | Ink 25 | Ink 26 |
| Compound 1 | | | | | | | |
| Compound 4 | | | | | | | |
| Compound 7 | | | | | | | |
| Compound 17 | 65 | 65 | 65 | 65 | 65 | 65 | 65 |
| Compound 21 | | | | | | | |
| Compound 25 | | | | | | | |
| Glycerin | 30 | 40 | 50 | 60 | 70 | 80 | 90 |
| Tetraethylene glycol | 90 | 90 | 90 | 90 | 90 | 90 | 90 |
| Triethylene glycol | 90 | 90 | 90 | 90 | 90 | 90 | 90 |
| Prolypene glycol | | | | | | | |
| Diethylene glycol | | | | | | | |
| 1,2-Hexanediol | | | | | | | |
| TEGmBE (*1) | 90 | 90 | 90 | 90 | 90 | 90 | 90 |
| DEGmBE (*1) | | | | | | | |
| Olfine E1010 (*2) | | | | | | | |
| Olfine PD001 (*2) | | | | | | | |
| Surfynol 465 (*2) | 10 | 10 | 10 | 10 | 10 | 10 | 10 |
| 2-Pyrrolidone | 90 | 90 | 90 | 90 | 90 | 90 | 90 |
| Urea | 5 | 5 | 5 | 5 | 5 | 5 | 5 |
| Triethanolamine | | | | | | | |
| Diethanolamine | 1 | 1 | 1 | 1 | 1 | 1 | 1 |
| Proxel XL2 (*3) | 5 | 5 | 5 | 5 | 5 | 5 | 5 |
| % By mass of humectant having 3 or more hydroxyl groups based on the whole amount of ink | 3.0 | 4.0 | 5.0 | 6.0 | 7.0 | 8.0 | 9.0 |
| Molar ratio | 7.14 | 9.52 | 11.90 | 14.28 | 16.66 | 19.04 | 21.42 |
| % By mass of humectant having 3 or more hydroxyl groups based on all the humectants | 7.58 | 9.85 | 12.02 | 14.08 | 16.06 | 17.94 | 19.74 |

(*1) TEGmBE: triethylene glycol monobutyl ether DEGmBE: diethylene glycol monobutyl ether
(*2) manufactured by Nissin Chemical Industry Co., Ltd.
(*3) manufactured by Fujifilm Imaging Colorants

TABLE 2

| | g/l | | | | | | | | |
|---|---|---|---|---|---|---|---|---|---|
| | Ink 27 | Ink 28 | Ink 29 | Ink 30 | Ink 31 | Ink 32 | Ink 33 | Ink 34 | Ink 35 |
| Compound 1 | | | | | | | | | |
| Compound 4 | | | | | | | | | |
| Compound 7 | 65 | 65 | 65 | 65 | 65 | 65 | 65 | 65 | 65 |
| Compound 17 | | | | | | | | | |
| Compound 21 | | | | | | | | | |
| Compound 25 | | | | | | | | | |
| Glycerin | 0 | 2 | 5 | 10 | 20 | 40 | 60 | 70 | 80 |
| Tetraethylene glycol | 90 | 90 | 90 | 90 | 90 | 90 | 90 | 90 | 90 |
| Triethylene glycol | 90 | 90 | 90 | 90 | 90 | 90 | 90 | 90 | 90 |
| Prolypene glycol | | | | | | | | | |
| Diethylene glycol | | | | | | | | | |
| 1,2-Hexanediol | | | | | | | | | |
| TEGmBE (*1) | 90 | 90 | 90 | 90 | 90 | 90 | 90 | 90 | 90 |
| DEGmBE (*1) | | | | | | | | | |
| Olfine E1010 (*2) | | | | | | | | | |
| Olfine PD001 (*2) | | | | | | | | | |
| Surfynol 465 (*2) | 10 | 10 | 10 | 10 | 10 | 10 | 10 | 10 | 10 |
| 2-Pyrrolidone | 90 | 90 | 90 | 90 | 90 | 90 | 90 | 90 | 90 |
| Urea | 5 | 5 | 5 | 5 | 5 | 5 | 5 | 5 | 5 |
| Triethanolamine | | | | | | | | | |
| Diethanolamine | 1 | 1 | 1 | 1 | 1 | 1 | 1 | 1 | 1 |
| Proxel XL2 (*3) | 5 | 5 | 5 | 5 | 5 | 5 | 5 | 5 | 5 |
| % By mass of humectant having 3 or more hydroxyl groups based on the whole amount of ink | 0.0 | 0.2 | 0.5 | 1.0 | 2.0 | 4.0 | 6.0 | 7.0 | 8.0 |
| Molar ratio | 0.00 | 0.37 | 0.92 | 1.84 | 3.68 | 7.35 | 11.03 | 12.87 | 14.70 |
| % By mass of humectant having 3 or more hydroxyl groups based on all the humectants | 0.00 | 0.54 | 1.35 | 2.66 | 5.18 | 9.85 | 14.08 | 16.06 | 17.94 |

| | g/l | | | | | | | | |
|---|---|---|---|---|---|---|---|---|---|
| | Ink 36 | Ink 37 | Ink 38 | Ink 39 | Ink 40 | Ink 41 | Ink 42 | Ink 43 | Ink 44 |
| Compound 1 | | 69 | 69 | 69 | 69 | 69 | 69 | 69 | 69 |
| Compound 4 | | | | | | | | | |
| Compound 7 | 65 | | | | | | | | |
| Compound 17 | | | | | | | | | |
| Compound 21 | | | | | | | | | |
| Compound 25 | | | | | | | | | |
| Glycerin | 90 | 5 | 10 | 20 | 30 | 40 | 50 | 60 | 70 |
| Tetraethylene glycol | 90 | 90 | 90 | 90 | 90 | 90 | 90 | 90 | 90 |
| Triethylene glycol | 90 | 90 | 90 | 90 | 90 | 90 | 90 | 90 | 90 |
| Prolypene glycol | | | | | | | | | |
| Diethylene glycol | | | | | | | | | |
| 1,2-Hexanediol | | | | | | | | | |
| TEGmBE (*1) | 90 | 90 | 90 | 90 | 90 | 90 | 90 | 90 | 90 |
| DEGmBE (*1) | | | | | | | | | |
| Olfine E1010 (*2) | | | | | | | | | |
| Olfine PD001 (*2) | | | | | | | | | |
| Surfynol 465 (*2) | 10 | 10 | 10 | 10 | 10 | 10 | 10 | 10 | 10 |
| 2-Pyrrolidone | 90 | 90 | 90 | 90 | 90 | 90 | 90 | 90 | 90 |
| Urea | 5 | 5 | 5 | 5 | 5 | 5 | 5 | 5 | 5 |
| Triethanolamine | | | | | | | | | |
| Diethanolamine | 1 | 1 | 1 | 1 | 1 | 1 | 1 | 1 | 1 |
| Proxel XL2 (*3) | 5 | 5 | 5 | 5 | 5 | 5 | 5 | 5 | 5 |
| % By mass of humectant having 3 or more hydroxyl groups based on the whole amount of ink | 9.0 | 0.5 | 1.0 | 2.0 | 3.0 | 4.0 | 5.0 | 6.0 | 7.0 |

TABLE 2-continued

| | | | | | | | | |
|---|---|---|---|---|---|---|---|---|
| Molar ratio | 16.54 | 0.89 | 1.78 | 3.55 | 5.33 | 7.10 | 8.88 | 10.65 | 12.43 |
| % By mass of humectant having 3 or more hydroxyl groups based on all the humectants | 19.74 | 1.35 | 2.66 | 5.18 | 7.58 | 9.85 | 12.02 | 14.08 | 16.06 |

| | g/l | | |
|---|---|---|---|
| | Ink 45 | Ink 46 | Ink 47 |
| Compound 1 | 69 | 69 | 69 |
| Compound 4 | | | |
| Compound 7 | | | |
| Compound 17 | | | |
| Compound 21 | | | |
| Compound 25 | | | |
| Glycerin | 80 | 85 | 90 |
| Tetraethylene glycol | 90 | 90 | 90 |
| Triethylene glycol | 90 | 90 | 90 |
| Prolypene glycol | | | |
| Diethylene glycol | | | |
| 1,2-Hexanediol | | | |
| TEGmBE (*1) | 90 | 90 | 90 |
| DEGmBE (*1) | | | |
| Olfine E1010 (*2) | | | |
| Olfine PD001 (*2) | | | |
| Surfynol 465 (*2) | 10 | 10 | 10 |
| 2-Pyrrolidone | 90 | 90 | 90 |
| Urea | 5 | 5 | 5 |
| Triethanolamine | | | |
| Diethanolamine | 1 | 1 | 1 |
| Proxel XL2 (*3) | 5 | 5 | 5 |
| % By mass of humectant having 3 or more hydroxyl groups based on the whole amount of ink | 8.0 | 8.5 | 9.0 |
| Molar ratio | 14.21 | 15.09 | 15.98 |
| % By mass of humectant having 3 or more hydroxyl groups based on all the humectants | 17.94 | 18.85 | 19.74 |

(*1) TEGmBE: triethylene glycol monobutyl ether DEGmBE: diethylene glycol monobutyl ether
(*2) manufactured by Nissin Chemical Industry Co., Ltd.
(*3) manufactured by Fujifilm Imaging Colorants

TABLE 3

| | g/l | | | | | | | |
|---|---|---|---|---|---|---|---|---|
| | Ink 48 | Ink 49 | Ink 50 | Ink 51 | Ink 52 | Ink 53 | Ink 54 | Ink 55 | Ink 56 |
| Compound 1 | 65 | | 65 | 65 | | 100 | 75 | 40 | |
| Compound 17 | | 65 | | | 65 | | | | 40 |
| Compound 34 | | | | | | | | 5 | 5 |
| Comp. compound 1 | | | | | | | | | |
| Comp. compound 2 | | | | | | | | | |
| Comp. compound 3 | | | | | | | | | |
| Comp. compound 4 | | | | | | | | | |
| Comp. compound 5 | | | | | | | | | |
| Comp. compound 6 | | | | | | | | | |
| Glycerin | 90 | 90 | 10 | 3 | 2 | 90 | 90 | 1 | 1 |
| Tetraethylene glycol | | | | 40 | | | | | |
| Triethylene glycol | 90 | 90 | 40 | 40 | 40 | 90 | 90 | 40 | 40 |
| Prolypene glycol | | | 40 | 40 | 40 | | | 40 | 40 |
| Diethylene glycol | | | | | 40 | | | | |
| 1,2-Hexanediol | | | | | | | | 10 | |
| TEGmBE (*1) | 90 | 90 | 90 | 90 | 90 | 90 | 90 | 90 | 90 |
| DEGmBE (*1) | | | | | 90 | | | | 90 |
| Olfine E1010 (*2) | | | | | 5 | 5 | 5 | | 5 |
| Olfine PD001 (*2) | | | | | | | | 5 | |

TABLE 3-continued

|  |  |  |  |  |  |  |  |  |  |
|---|---|---|---|---|---|---|---|---|---|
| Surfynol 465 (*2) | 10 | 10 | 10 | 10 | 10 | 10 | 10 | 10 | 10 |
| 2-Pyrrolidone | 50 | 50 | 50 | 50 | 50 | 50 | 50 | 50 | 50 |
| Urea | 25 | 10 | 20 | 20 | 20 | 20 | 20 | 20 | 20 |
| Triethanolamine |  |  |  |  |  |  |  |  |  |
| Diethanolamine | 7 | 7 | 7 | 7 | 7 | 10 | 7 | 4 | 4 |
| Proxel XL2 (*3) | 5 | 5 | 5 | 5 | 5 | 5 | 5 | 5 | 5 |
| % By mass of humectant having 3 or more hydroxyl groups based on the whole amount of ink | 9.0 | 9.0 | 1.0 | 0.3 | 0.2 | 9.0 | 9.0 | 0.1 | 0.1 |
| Molar ratio | 16.96 | 21.42 | 1.88 | 0.57 | 0.48 | 11.03 | 14.70 | 0.31 | 0.39 |
| % By mass of humectant having 3 or more hydroxyl groups based on all the humectants | 25.57 | 26.71 | 3.89 | 1.03 | 0.53 | 25.71 | 25.94 | 0.39 | 0.30 |

|  | g/l | | | | | | | | | |
|---|---|---|---|---|---|---|---|---|---|---|
|  | Ink 57 | Ink 58 | Ink 59 | Ink 60 | Ink 61 | Ink 62 | Ink 63 | Ink 64 | Ink 65 | Ink 66 |
| Compound 1 | 20 |  | 65 |  |  |  |  |  |  |  |
| Compound 17 |  | 20 |  | 65 |  |  |  |  |  |  |
| Compound 34 |  |  |  |  |  |  |  |  |  |  |
| Comp. compound 1 |  |  |  |  | 60 |  |  |  |  |  |
| Comp. compound 2 |  |  |  |  |  | 60 |  |  |  |  |
| Comp. compound 3 |  |  |  |  |  |  | 60 |  |  |  |
| Comp. compound 4 |  |  |  |  |  |  |  | 60 |  |  |
| Comp. compound 5 |  |  |  |  |  |  |  |  | 60 |  |
| Comp. compound 6 |  |  |  |  |  |  |  |  |  | 60 |
| Glycerin | 1 | 1 | 3 | 2 | 0.8 | 0.8 | 0.8 | 0.8 | 0.8 | 0.8 |
| Tetraethylene glycol |  |  |  |  |  |  |  |  |  |  |
| Triethylene glycol | 40 | 40 | 40 | 40 | 90 | 90 | 90 | 90 | 90 | 90 |
| Prolypene glycol | 40 | 40 | 40 | 40 | 90 | 90 | 90 | 90 | 90 | 90 |
| Diethylene glycol |  |  |  |  |  |  |  |  |  |  |
| 1,2-Hexanediol |  |  |  |  |  |  |  |  |  |  |
| TEGmBE (*1) | 90 | 90 | 90 | 90 | 90 | 90 | 90 | 90 | 90 | 90 |
| DEGmBE (*1) |  | 90 |  | 90 |  |  |  |  |  |  |
| Olfine E1010 (*2) |  | 5 |  | 5 |  |  |  |  |  |  |
| Olfine PD001 (*2) | 5 |  | 5 |  |  |  |  |  |  |  |
| Surfynol 465 (*2) | 10 | 10 | 10 | 10 | 10 | 10 | 10 | 10 | 10 | 10 |
| 2-Pyrrolidone | 50 | 50 | 50 | 50 | 50 | 50 | 50 | 50 | 50 | 50 |
| Urea | 20 | 20 | 20 | 20 | 20 | 20 | 20 | 20 | 20 | 20 |
| Triethanolamine |  |  |  |  |  |  |  |  |  |  |
| Diethanolamine | 2 | 2 | 7 | 7 | 7 | 7 | 7 | 7 | 7 | 7 |
| Proxel XL2 (*3) | 5 | 5 | 5 | 5 | 5 | 5 | 5 | 5 | 5 | 5 |
| % By mass of humectant having 3 or more hydroxyl groups based on the whole amount of ink | 0.1 | 0.1 | 0.3 | 0.2 | 0.1 | 0.1 | 0.1 | 0.1 | 0.1 | 0.1 |
| Molar ratio | 0.61 | 0.77 | 0.57 | 0.48 | — | — | — | — | — | — |
| % By mass of humectant having 3 or more hydroxyl groups based on all the humectants | 0.41 | 0.30 | 1.20 | 0.59 | 0.23 | 0.23 | 0.23 | 0.23 | 0.23 | 0.23 |

(*1) TEGmBE: triethylene glycol monobutyl ether DEGmBE: diethylene glycol monobutyl ether (*2) manufactured by Nissin Chemical Industry Co., Ltd.

(*3) manufactured by Fujifilm Imaging Colorants

Additionally, structures of comparative compounds 1 to 6 are shown below.
[Chem. 15]
Comparative compound 1
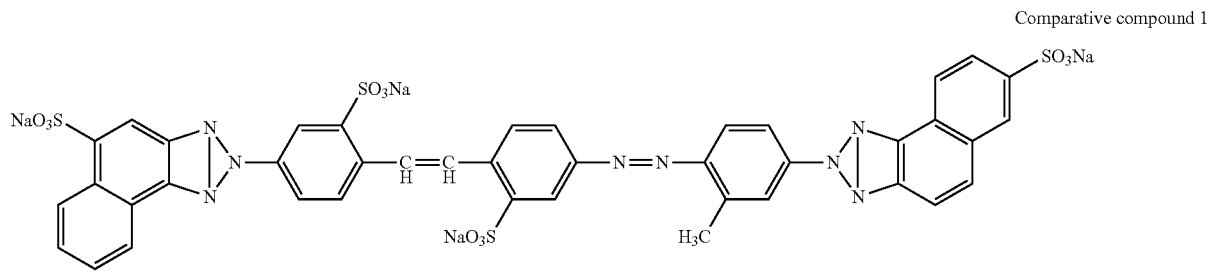
Comparative compound 2
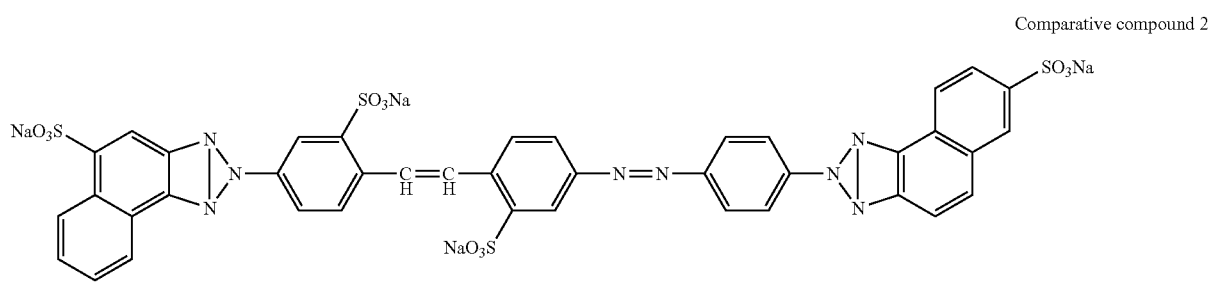
Comparative compound 3
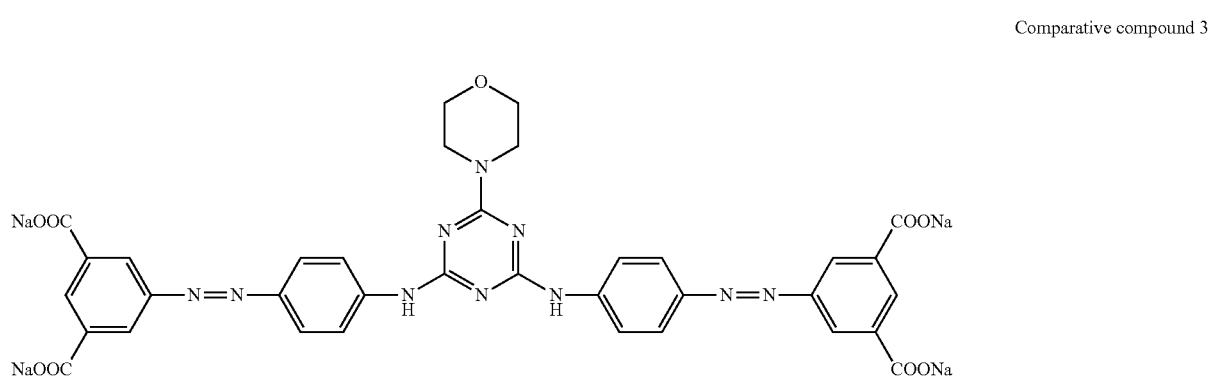
Comparative compound 4
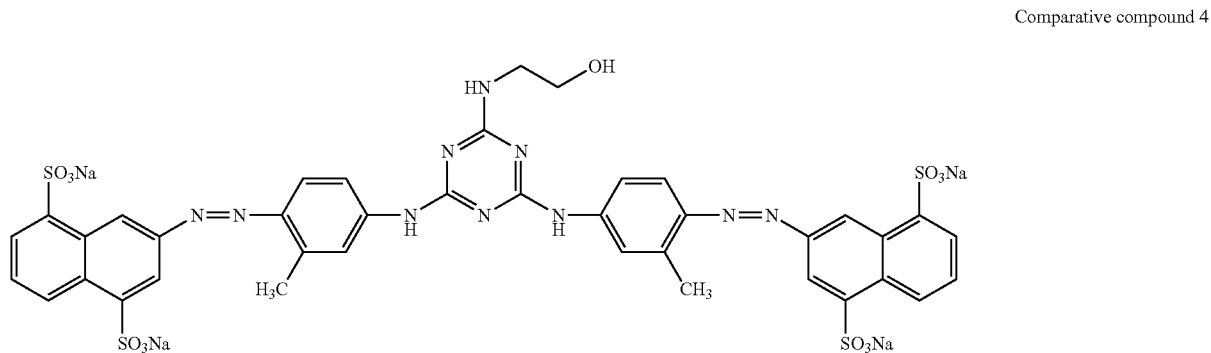

-continued

Comparative compound 5

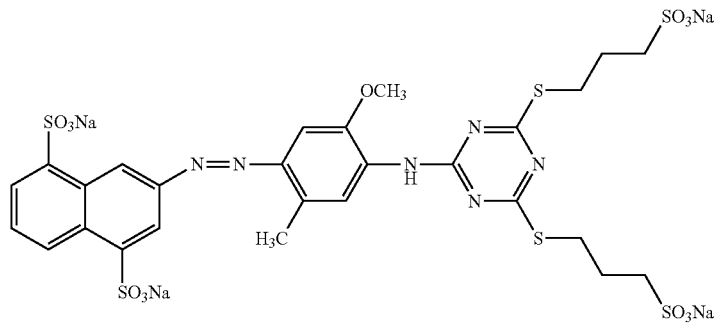

Comparative compound 6

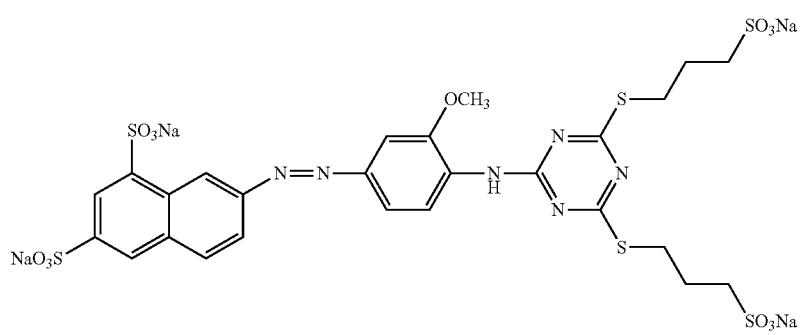

(Forced Heating Experiment)

10 mL of each of the inks prepared according to the formulations shown in Table 1, Table 2, and Table 3 is placed in a sample bottle and stored at 70° C. for 6 days. The residual ratios of the compounds are measured by means of a high-pressure liquid chromatography (HPLC; LC-20AT manufactured by Shimadzu Corporation). Evaluation is conducted according to the criteria that samples showing a residual ratio of less than 80% in terms of HPLC area are ranked F, samples showing a residual ratio of from 80 to less than 84% are ranked E, samples showing a residual ratio of from 84 to less than 88 are ranked D, samples showing a residual ratio of from 88 to less than 92 are ranked C, samples showing a residual ratio of from 92 to less than 96% are ranked B, and samples showing a residual ratio of from 96 to 100% are ranked A. The results are shown in Table 4, Table 5, and Table 6 as heat stability.

(Experiment for Evaluation of Printed Image)

Each of the inks prepared according to the formulations shown in Table 1, Table 2, and Table 3 is placed in a cartridge of a inkjet printer PM-G800 manufactured by EPSON, and a mono-color image pattern wherein the density is changed stepwise is printed by means of PM-G800 using, as an image-receiving sheet, EPSON photographic paper <Kotaku> as paper a, photographic paper CRISPIA <Kokotaku> as paper b, PR101 manufactured by Canon Inc. as paper c, Advanced Photo Paper manufactured by Hewlett-Packard as paper d, and Gasai manufactured by Fujifilm as paper e to thereby evaluate image fastness.

Regarding image storage stability, the following evaluation is conducted by measuring color density.

[1] Image density Ci of the sample just after printing is measured by X-rite 310, then the sample is irradiated with xenon light (100,000 lux) using a weather meter (manufactured by Atlas Co., Ltd.) for 7 days, and then image density Cf of the sample is measured to determine an image remaining ratio (Cf/Ci×100), whereby the light fastness is evaluated. The image remaining ratio is evaluated at 3 points having reflection density of 0.7, 1.2 and 2.0 respectively, and a case wherein the image remaining ratio is 85% or more at all three points is ranked A, a case wherein the image remaining ratio is less than 85% at one point is ranked B, a case wherein the image remaining ratio is less than 85% at two points is ranked C, and a case wherein the image remaining ratio is less than 85% at all three points is ranked D.

[2] Regarding ozone resistance (ozone fastness), the printed sample is left for 7 days in a box wherein the ozone gas concentration is adjusted to 5 ppm, and the image density is measured before and after leaving the paper in the ozone gas atmosphere using a reflection densitometer (X-Rite 310TR) to evaluate ozone fastness in terms of the image-remaining ratio. Additionally, the reflection density is measured at three points where the densities are 0.7, 1.2 and 2.0, respectively. The ozone gas density within the box is monitored by means of an ozone gas monitor (model: OZG-EM-01) made by APPLICS. The evaluation is conducted in four ranks, that is, a case wherein the image remaining ratio is 85% or more at all three points is ranked A, a case wherein the image remaining ratio is less than 85% at one point is ranked B, a case wherein the image remaining ratio is less than 85% at two points is ranked C, and a case where the image remaining ratio is less than 85% at all the points is ranked D.

The results are shown in Table 4, Table 5, and Table 6. In Table 4, Table 5, and Table 6, the term "molar ratio" means a molar ratio of a humectant having 3 or more hydroxyl groups/a compound represented by the foregoing general formula (1). Also, in Table 4, Table 5, and Table 6, the term "% by mass (*1)" means a % by mass of the humectant having 3 or more hydroxyl groups based on the whole amount of the ink, and the term "% by mass (*2)" means a % by mass of the humectant having 3 or more hydroxyl groups based on all the humectants.

TABLE 4

| Ink No. | % By mass (*1) | Molar Ratio | % By mass (*2) | Heat Stability | Light Fastness Paper a | Paper b | Paper c | Paper d | Paper e | Ozone Fastness Paper a | Paper b | Paper c | Paper d | Paper e | Note |
|---|---|---|---|---|---|---|---|---|---|---|---|---|---|---|---|
| Ink 1 | 0.17 | 0.29 | 0.70 | A | A | A | A | A | A | A | A | A | A | A | Present Intion |
| Ink 2 | 0.12 | 0.25 | 0.35 | A | A | A | A | A | A | A | A | A | A | A | " |
| Ink 3 | 0.15 | 0.24 | 0.40 | A | A | A | A | A | A | A | A | A | A | A | " |
| Ink 4 | 0.15 | 0.24 | 0.50 | A | A | A | A | A | A | A | A | A | A | A | " |
| Ink 5 | 0.10 | 0.22 | 0.29 | A | A | A | A | A | A | A | A | A | A | A | " |
| Ink 6 | 0.15 | 0.31 | 0.55 | A | A | A | A | A | A | A | A | A | A | A | " |
| Ink 7 | 0.15 | 0.21 | 0.63 | A | A | A | A | A | A | A | A | A | A | A | " |
| Ink 8 | 0.00 | 0.00 | 0.00 | A | A | A | A | A | A | A | A | A | A | A | " |
| Ink 9 | 0.10 | 0.25 | 0.29 | A | A | A | A | A | A | A | A | A | A | A | " |
| Ink 10 | 0.10 | 0.31 | 0.30 | A | A | A | A | A | A | A | A | A | A | A | " |
| Ink 11 | 0.10 | 0.31 | 0.41 | A | A | A | A | A | A | A | A | A | A | A | " |
| Ink 12 | 0.00 | 0.00 | 0.00 | A | A | A | A | A | A | A | A | A | A | A | " |
| Ink 13 | 0.03 | 0.18 | 0.09 | A | A | A | A | A | A | A | A | A | A | A | " |
| Ink 14 | 0.03 | 0.23 | 0.09 | A | A | A | A | A | A | A | A | A | A | A | " |
| Ink 15 | 0.01 | 0.17 | 0.03 | A | A | A | A | A | A | A | A | A | A | A | " |
| Ink 16 | 0.01 | 0.21 | 0.03 | A | A | A | A | A | A | A | A | A | A | A | " |
| Ink 17 | 0.50 | 1.19 | 1.35 | C | A | A | A | A | A | A | A | A | A | A | " |
| Ink 18 | 1.00 | 2.38 | 2.66 | C | A | A | A | A | A | A | A | A | A | A | " |
| Ink 19 | 2.00 | 4.76 | 5.18 | C | A | A | A | A | A | A | A | A | A | A | " |
| Ink 20 | 3.00 | 7.14 | 7.58 | D | A | A | A | A | A | A | A | A | A | A | " |
| Ink 21 | 4.00 | 9.52 | 9.85 | D | A | A | A | A | A | A | A | A | A | A | " |
| Ink 22 | 5.00 | 11.90 | 12.02 | D | A | A | A | A | A | A | A | A | A | A | " |
| Ink 23 | 6.00 | 14.28 | 14.08 | D | A | A | A | A | A | A | A | A | A | A | " |
| Ink 24 | 7.00 | 16.66 | 16.06 | F | B | A | B | B | B | A | A | B | B | A | Comp. Example |
| Ink 25 | 8.00 | 19.04 | 17.94 | F | A | A | A | B | A | B | B | B | A | B | " |
| Ink 26 | 9.00 | 21.42 | 19.74 | F | B | B | A | B | A | A | A | B | B | A | " |

(*1): % by mass of the humectant having 3 or more hydroxyl groups based on the total amont of the ink
(*2): % by mass of the humectant having 3 or more hydroxyl groups based on all the humectants

TABLE 5

| Ink No. | % By mass (*1) | Molar Ratio | % By mass (*2) | Heat Stability | Light Fastness Paper a | Paper b | Paper c | Paper d | Paper e | Ozone Fastness Paper a | Paper b | Paper c | Paper d | Paper e | Note |
|---|---|---|---|---|---|---|---|---|---|---|---|---|---|---|---|
| Ink 27 | 0.00 | 0.00 | 0.00 | D | A | A | A | A | A | A | A | A | A | A | Present Invention |
| Ink 28 | 0.20 | 0.37 | 0.54 | C | A | A | A | A | A | A | A | A | A | A | " |
| Ink 29 | 0.50 | 0.92 | 1.35 | C | A | A | A | A | A | A | A | A | A | A | " |
| Ink 30 | 1.00 | 1.84 | 2.66 | C | A | A | A | A | A | A | A | A | A | A | " |
| Ink 31 | 2.00 | 3.68 | 5.18 | D | A | A | A | A | A | A | A | A | A | A | " |
| Ink 32 | 4.00 | 7.35 | 9.85 | D | A | A | A | A | A | A | A | A | A | A | " |
| Ink 33 | 6.00 | 11.03 | 14.08 | D | A | A | A | A | A | A | A | A | A | A | " |
| Ink 34 | 7.00 | 12.87 | 16.06 | D | A | A | A | A | A | A | A | A | A | A | " |
| Ink 35 | 8.00 | 14.70 | 17.94 | D | A | A | A | A | A | A | A | A | A | A | " |
| Ink 36 | 9.00 | 16.54 | 19.74 | F | A | A | B | B | A | A | A | B | B | A | Comp. Example |
| Ink 37 | 0.50 | 0.89 | 1.35 | B | A | A | A | A | A | A | A | A | A | A | Present Invention |
| Ink 38 | 1.00 | 1.78 | 2.66 | C | A | A | A | A | A | A | A | A | A | A | " |
| Ink 39 | 2.00 | 3.55 | 5.18 | C | A | A | A | A | A | A | A | A | A | A | " |
| Ink 40 | 3.00 | 5.33 | 7.58 | D | A | A | A | A | A | A | A | A | A | A | " |
| Ink 41 | 4.00 | 7.10 | 9.85 | D | A | A | A | A | A | A | A | A | A | A | " |
| Ink 42 | 5.00 | 8.88 | 12.02 | D | A | A | A | A | A | A | A | A | A | A | " |
| Ink 43 | 6.00 | 10.65 | 14.08 | D | A | A | A | A | A | A | A | A | A | A | " |
| Ink 44 | 7.00 | 12.43 | 16.06 | D | A | A | A | A | A | A | A | A | A | A | " |
| Ink 45 | 8.00 | 14.21 | 17.94 | D | A | A | A | A | A | A | A | A | A | A | " |
| Ink 46 | 8.50 | 15.09 | 18.85 | F | A | B | B | B | B | A | B | B | B | A | Comp. Example |
| Ink 47 | 9.00 | 15.98 | 19.74 | F | A | B | B | B | B | B | B | B | B | A | " |

(*1): % by mass of the humectant having 3 or more hydroxyl groups based on the total amount of the ink
(*2): % by mass of the humectant having 3 or more hydroxyl groups based on all the humectants

TABLE 6

| Ink No. | % By mass (*1) | Molar Ratio | % By mass (*2) | Heat Stability | Light Fastness Paper a | Paper b | Paper c | Paper d | Paper e | Ozone Fastness Paper a | Paper b | Paper c | Paper d | Paper e | Note |
|---|---|---|---|---|---|---|---|---|---|---|---|---|---|---|---|
| Ink 48 | 9.00 | 16.96 | 25.57 | F | A | B | B | B | A | B | B | B | B | A | Comp. Example |
| Ink 49 | 9.00 | 21.42 | 26.71 | F | A | B | B | B | A | B | B | B | B | A | " |
| Ink 50 | 1.00 | 1.88 | 3.89 | B | A | A | A | A | A | A | A | A | A | A | Present Invention |
| Ink 51 | 0.30 | 0.57 | 1.03 | B | A | A | A | A | A | A | A | A | A | A | " |
| Ink 52 | 0.20 | 0.48 | 0.53 | B | A | A | A | A | A | A | A | A | A | A | " |
| Ink 53 | 9.00 | 11.03 | 25.71 | F | A | A | A | A | A | A | A | A | A | A | Comp. Example |
| Ink 54 | 9.00 | 14.70 | 25.94 | F | A | B | A | A | A | A | B | A | A | A | " |
| Ink 55 | 0.10 | 0.31 | 0.39 | A | A | A | A | A | A | A | A | A | A | A | Present Invention |
| Ink 56 | 0.10 | 0.39 | 0.30 | A | A | A | A | A | A | A | A | A | A | A | " |
| Ink 57 | 0.10 | 0.61 | 0.41 | B | A | A | A | A | A | A | A | A | A | A | " |
| Ink 58 | 0.10 | 0.77 | 0.30 | B | A | A | A | A | A | A | A | A | A | A | " |
| Ink 59 | 0.30 | 0.57 | 1.20 | B | A | A | A | A | A | A | A | A | A | A | " |
| Ink 60 | 0.20 | 0.48 | 0.59 | B | A | A | A | A | A | A | A | A | A | A | " |
| Ink 61 | 0.08 | — | 0.23 | A | C | C | C | C | C | C | C | C | C | C | Comp. Example |
| Ink 62 | 0.08 | — | 0.23 | A | C | C | C | C | C | C | C | C | C | C | " |
| Ink 63 | 0.08 | — | 0.23 | A | C | C | C | C | C | C | C | C | C | C | " |
| Ink 64 | 0.08 | — | 0.23 | A | C | C | C | C | C | C | C | C | C | C | " |
| Ink 65 | 0.08 | — | 0.23 | A | C | C | C | C | C | C | C | C | C | C | " |
| Ink 66 | 0.08 | — | 0.23 | A | C | C | C | C | C | C | C | C | C | C | " |

(*1): % by mass of the humectant having 3 or more hydroxyl groups based on the total amount of the ink
(*2): % by mass of the humectant having 3 or more hydroxyl groups based on all the humectants From the results shown in Table 4, Table 5, and Table 6, it is seen that the ink composition of the invention has a high heat stability, can be stored for a long time, and has excellent balance between these performances. Also, a printed image using the ink composition of the invention is found to be excellent in light fastness and ozone gas fastness and has excellent balance between these performances.

INDUSTRIAL APPLICABILITY

According to the present invention, there can be provided an ink composition which, even when stored under an environment of high temperature, undergoes suppressed fading of colorants or change in color thereof and, further, forms a printed image having excellent light fastness and ozone gas fastness.

Although the invention has been described in detail and by reference to specific embodiments, it is apparent to those skilled in the art that it is possible to add various alterations and modifications insofar as the alterations and modifications do not deviate from the spirit and the scope of the invention.

This application is based on a Japanese patent application filed on Jun. 16, 2008 (Japanese Patent Application No. 2008-157029), and the contents thereof are incorporated herein by reference.

The invention claimed is:

1. An ink composition which contains a compound represented by the following general formula (1) and a humectant, wherein the content of the compound represented by the general formula (1) is from 0.1% by mass to less than 7.0% by mass, the content of humectant having 3 or more hydroxyl groups is 8.0% by mass or less, the ink composition contains at least glycerin as the humectant having 3 or more hydroxyl groups, and the molar ratio of the humectant having 3 or more hydroxyl groups/the compound represented by the general formula (1) is less than 15.0;

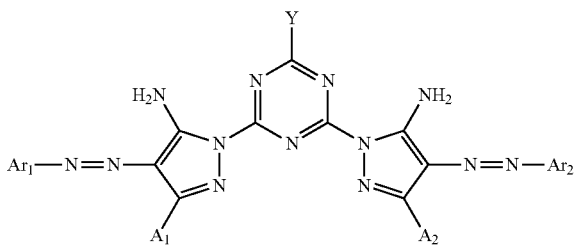

General formula (1)

wherein in the above general formula (1),
Ar$_1$ and Ar$_2$ each independently represents an aromatic hydrocarbon ring group, a non-aromatic hydrocarbon ring group, an aromatic heterocyclic group, or a non-aromatic heterocyclic group, A$_1$ and A$_2$ each independently represents a hydrogen atom or a substituent, Y represents —OM or —NR$_1$R$_2$, M represents a hydrogen atom or a metal ion, and R$_1$ and R$_2$ each independently represents a hydrogen atom, an alkyl group, an alkenyl group, an alkynyl group, an aralkyl group, an aryl group, or a heterocyclic group.

2. The ink composition described in claim 1, wherein the content of the humectant having 3 or more hydroxyl groups is 5.0% by mass or less.

3. The ink composition described in claim 1, wherein the molar ratio is less than 5.0.

4. The ink composition described in claim 1, wherein the molar ratio is less than 2.0.

5. The ink composition described in claim 1, which further contains a humectant having from 0 to 2 hydroxyl groups.

6. The ink composition described in claim 1, wherein the content of the humectant having 3 or more hydroxyl groups is less than 18.0% by mass of all humectants.

7. The ink composition described in claim 1, wherein the content of the humectant having 3 or more hydroxyl groups is less than 10.0% by mass of all humectants.

8. The ink composition described in claim 1, wherein the content of the humectant having 3 or more hydroxyl groups is less than 4.0% by mass of all humectants.

9. The ink composition described in claim 1, wherein the compound represented by the general formula (1) is a compound represented by the general formula (2);

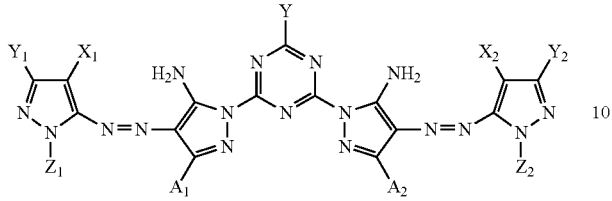

General formula (2)

wherein in the above general formula (2), $A_1$, $A_2$, and Y are the same as $A_1$, $A_2$, and Y in the general formula (1), $Y_1$ and $Y_2$ each independently represents a hydrogen atom or a substituent, $X_1$ and $X_2$ each independently represents an electron-withdrawing group having a Hammett σp value of 0.20 or more, and $Z_1$ and $Z_2$ each independently represents a hydrogen atom, an alkyl group, an alkenyl group, an alkynyl group, an aralkyl group, an aryl group, or a heterocyclic group.

10. The ink composition described in claim 9, wherein the compound represented by the general formula (2) is a compound represented by the general formula (3);

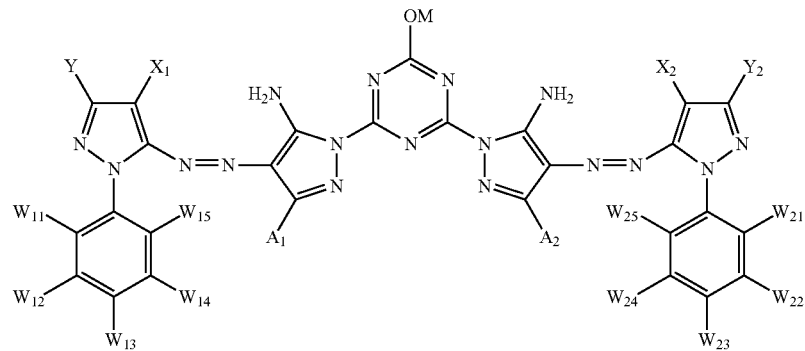

General formula (3)

wherein in the above general formula (3), $A_1$, $A_2$, $X_1$, $X_2$, $Y_1$, and $Y_2$ are the same as $A_1$, $A_2$, $X_1$, $X_2$, $Y_1$, and $Y_2$ in the general formula (2), $W_{11}$, $W_{12}$, $W_{13}$, $W_{14}$, $W_{15}$, $W_{21}$, $W_{22}$, $W_{23}$, $W_{24}$, and $W_{25}$ each independently represents a hydrogen atom or a substituent, and M represents a hydrogen atom or a metal ion.

11. The ink composition described in claim 1, wherein the compound represented by the general formula (1) is a compound represented by the general formula (4);

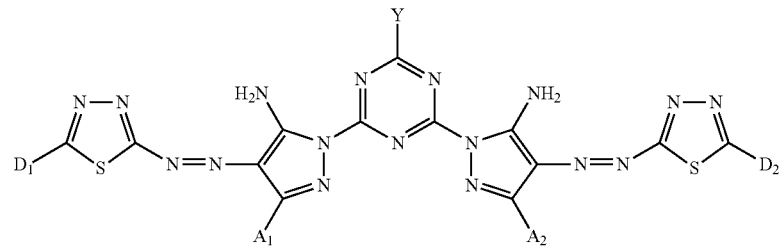

General formula (4)

wherein in the above general formula (4), $A_1$, $A_2$, and Y are the same as $A_1$, $A_2$, and Y in the general formula (1), and $D_1$ and $D_2$ each independently represents a hydrogen atom or a substituent.

12. The ink composition described in claim 11, wherein the compound represented by the general formula (4) is a compound represented by the general formula (5);

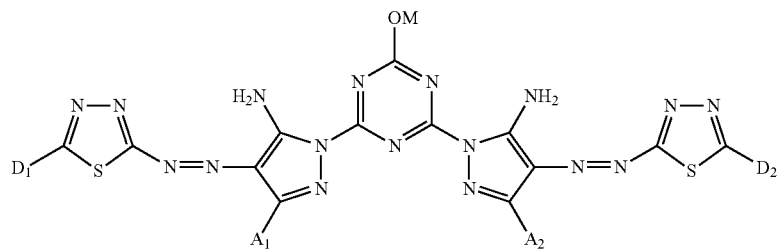

General formula (5)

wherein in the above general formula (5), $A_1, A_2, D_1,$ and $D_2$ are the same as $A_1, A_2, D_1,$ and $D_2$ in the general formula (4), M is the same as M in the general formula (1).

13. An ink composition for inkjet recording, wherein the ink composition described in claim 1 is utilized.

14. An ink set for use in an inkjet recording method, which contains the ink composition described in claim 1 as a constituent.

15. An ink cartridge which contains the ink composition described in claim 1.

16. An ink cartridge which has the ink set described in claim 14 integrally or independently.

17. An inkjet recording method of ejecting liquid droplets of an ink composition and depositing the liquid droplets onto a recording medium, which comprises conducting recording by utilizing the ink set described in claim 14.

18. A recorded product which is printed according to the inkjet recording method described in claim 17.

19. The ink composition described in claim 1, wherein the ink composition further contains any of trimethylolpropane, triethanolamine, and trishydroxymethylaminemethane.

* * * * *